(12) United States Patent
Kanaguchi

(10) Patent No.: US 11,597,449 B2
(45) Date of Patent: Mar. 7, 2023

(54) VEHICLE OUTER PLATE PANEL AND METHOD FOR MANUFACTURING VEHICLE OUTER PLATE PANEL

(71) Applicant: HONDA MOTOR CO., LTD., Tokyo (JP)

(72) Inventor: Yutaka Kanaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 232 days.

(21) Appl. No.: 16/641,435

(22) PCT Filed: Apr. 2, 2018

(86) PCT No.: PCT/JP2018/014160
§ 371 (c)(1),
(2) Date: Feb. 24, 2020

(87) PCT Pub. No.: WO2019/044020
PCT Pub. Date: Mar. 7, 2019

(65) Prior Publication Data
US 2021/0139081 A1    May 13, 2021

(30) Foreign Application Priority Data
Aug. 30, 2017 (JP) .............................. JP2017-166171

(51) Int. Cl.
*B62D 29/04* (2006.01)
*B60R 13/04* (2006.01)
(Continued)

(52) U.S. Cl.
CPC ......... *B62D 29/043* (2013.01); *B29D 99/001* (2013.01); *B60R 13/04* (2013.01); *B62D 29/048* (2013.01); *B29K 2069/00* (2013.01)

(58) Field of Classification Search
CPC .... B62D 25/10; B62D 29/043; B62D 29/048; B60J 5/107; B60R 13/04; B29D 99/001; B29D 99/0014
See application file for complete search history.

(56) References Cited

U.S. PATENT DOCUMENTS 4,493,680 A * 1/1985 Hoffmann ............... F16G 13/06
                                                              16/386
4,748,062 A   5/1988 Menjo et al.
(Continued)

FOREIGN PATENT DOCUMENTS

CN       1621226 A     6/2005
CN     101068673 A    11/2007
(Continued)

OTHER PUBLICATIONS

International Search Report by ISA/JP dated May 15, 2018, on PCT/JP2018/014160, 2 pages.
(Continued)

*Primary Examiner* — Gregory A Blankenship
(74) *Attorney, Agent, or Firm* — Rankin, Hill & Clark LLP

(57) ABSTRACT

A vehicle outer plate panel includes: a transparent resin plate that is formed into a prescribed shape through pressure molding and is attached to a vehicle so as to constitute an outer wall of a body; and a decorative layer that is formed on at least a part of the transparent resin plate through screen printing such that the transparent resin plate is decorated therewith. A method of producing an vehicle outer plate panel is also disclosed.

10 Claims, 30 Drawing Sheets

(51) Int. Cl.
    *B29D 99/00*     (2010.01)
    *B29K 69/00*     (2006.01)

(56) References Cited

U.S. PATENT DOCUMENTS

| | | | |
|---|---|---|---|
| 5,711,592 A * | 1/1998 | Hotta | F21S 43/237 |
| | | | 362/496 |
| 6,024,904 A | 2/2000 | Nanri et al. | |
| 2005/0112330 A1 | 5/2005 | Suzuki et al. | |
| 2009/0114341 A1 | 5/2009 | Suzuki et al. | |
| 2010/0028610 A1 | 2/2010 | Fujii et al. | |
| 2011/0211017 A1 | 9/2011 | Maruoka et al. | |
| 2014/0203142 A1 * | 7/2014 | Travalini | B62D 29/043 |
| | | | 244/119 |
| 2014/0355285 A1 | 12/2014 | Yamato | |
| 2016/0052243 A1 | 2/2016 | Kondo et al. | |
| 2017/0001367 A1 * | 1/2017 | Hofer | B62D 29/043 |
| 2017/0361689 A1 * | 12/2017 | Costa | B60Q 1/2619 |
| 2018/0244136 A1 * | 8/2018 | Schellekens | B60Q 1/0035 |
| 2019/0071009 A1 | 3/2019 | Yamato | |
| 2019/0193533 A1 * | 6/2019 | Chiba | B62D 29/043 |
| 2020/0079003 A1 * | 3/2020 | van Rees | B29D 99/0003 |
| 2020/0298537 A1 * | 9/2020 | Lozier | B32B 21/10 |
| 2020/0324627 A1 * | 10/2020 | Wetzel | B60J 1/2011 |
| 2021/0024139 A1 * | 1/2021 | Tsutsumi | B62D 25/08 |
| 2021/0170730 A1 * | 6/2021 | Zhao | B32B 3/266 |
| 2021/0245588 A1 * | 8/2021 | Miyake | E05B 83/18 |

FOREIGN PATENT DOCUMENTS

| | | |
|---|---|---|
| CN | 102189780 A | 9/2011 |
| CN | 103958273 A | 7/2014 |
| CN | 105102226 A | 11/2015 |
| EP | 2979865 A1 | 2/2016 |
| JP | H08-99610 A | 4/1996 |
| JP | H08-229914 A | 9/1996 |
| JP | 3527486 B2 | 5/2004 |
| JP | 2010-030215 A | 2/2010 |
| JP | 2016-026907 A | 2/2016 |
| JP | 2016058136 A | 4/2016 |
| JP | 2016-132344 A | 7/2016 |
| TW | 201444688 A | 12/2014 |
| WO | 2009/150800 A1 | 12/2009 |
| WO | 2014157320 A1 | 10/2014 |

OTHER PUBLICATIONS

Written Opinion by ISA/JP dated May 15, 2018, on PCT/JP2018/014160, 9 pages.

Office Action received in corresponding CN application No. 201880055944.5 dated Dec. 3, 2021 with English translation (15 pages).

Office Action received in corresponding Chinese application No. 201880055944.5 dated Jul. 20, 2022 with English translation (13 pages).

Office Action received in corresponding CN application No. 201880055944.5 dated Nov. 14, 2022 with English translation (15 pages).

\* cited by examiner

VEHICLE OUTER PLATE PANEL AND METHOD FOR MANUFACTURING VEHICLE OUTER PLATE PANEL

TECHNICAL FIELD

The present invention relates to a vehicle outer plate panel and a method for manufacturing the vehicle outer plate panel.

BACKGROUND ART

Vehicle body outer walls are typically structured using metal vehicle outer plate panels (hereinafter, sometimes referred to as an "outer plate panel"). Such an outer plate panel has resin moldings attached so as to improve a body design (see the following Patent Literature 1).

CITATION LIST

Patent Literature

Patent Literature 1: Japanese Patent Application Publication No. 2016-132344

SUMMARY OF INVENTION

Technical Problem

Unfortunately, the conventional body appearance has been structured by attaching a large number of parts to an outer plate panel. This has caused an increase in the number of manufacturing steps. Accordingly, an outer plate panel having a design that can be improved with a simple configuration has been sought.

Here, the present invention has been created in view of the above situations and addresses the problem of providing: a vehicle outer plate panel having a design which can be improved with a simple configuration; and a method for manufacturing the vehicle outer plate panel.

Solution to Problem

As a means for solving the problem, a vehicle outer plate panel according to the present invention is characterized by being provided with: a transparent resin plate that is formed into a prescribed shape through pressure molding and is attached to a vehicle so as to constitute an outer wall of a body; and a decorative layer that is formed on at least a part of the transparent resin plate through screen printing such that the transparent resin plate is decorated therewith.

Advantageous Effects of Invention

According to the vehicle outer plate panel and the method for manufacturing the vehicle outer plate panel, the configuration can be simple and the design can also be improved.

DESCRIPTION OF EMBODIMENTS

Next, an outer plate panel according to an embodiment is described with reference to the Drawings.

First, the basic structure of the outer plate panel according to the first embodiment will be illustrated. Next, described are embodiments in which the outer plate panel is applied to each vehicle body part.

Note that for description convenience, on the outer plate panel, a vehicle outside surface is referred to as an outside surface and a vehicle inside surface is referred to as a back surface.

First Embodiment

Figure 1:
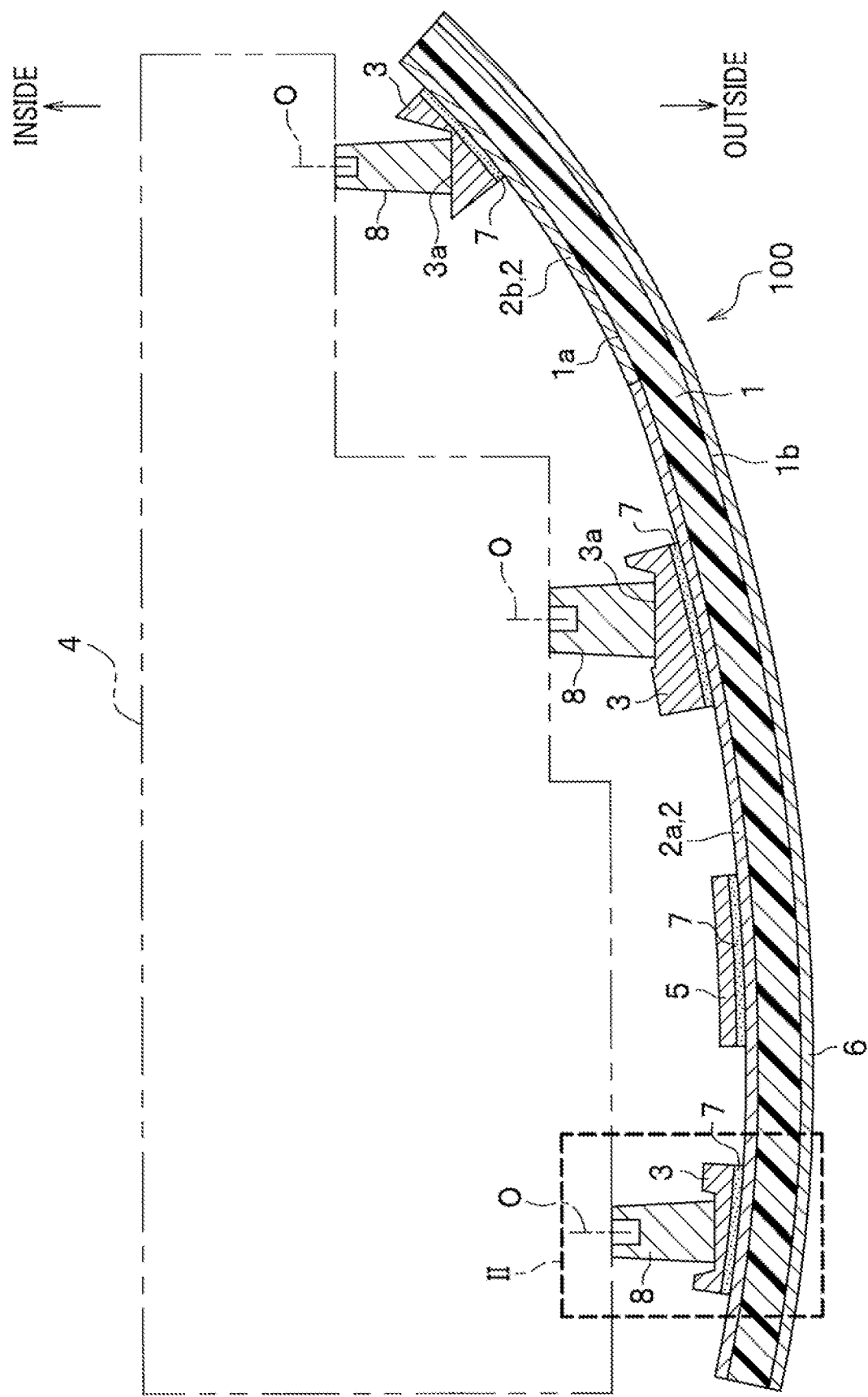
FIG. 1 is a cross-sectional view of an outer plate panel according to a first embodiment.

As shown in FIG. 1, an outer plate panel 100 includes: a transparent resin plate 1 that is formed into a prescribed shape by pressure molding and is attached to a vehicle so as to constitute an outer wall of a body; a decorative layer 2 that is formed on at least a part of the transparent resin plate 1 by screen printing such that the transparent resin plate 1 is decorated therewith; a pedestal member 3 provided on a back surface 1a side of the transparent resin plate 1; an on-vehicle part 4 that is fixed via the pedestal member 3 on the back surface 1a side of the transparent resin plate 1; and a stiffener 5.

Note that in this embodiment, the decorative layer 2 is provided on the back surface 1a of the transparent resin plate 1. In addition, a protective layer 6 is provided on the outside surface 1b side of the transparent resin plate 1.

The transparent resin plate 1 is shaped like a plate and is made of thermoplastic resin. Specifically, the transparent resin plate 1 in this embodiment is made of polycarbonate. Note that examples of a material for the transparent resin plate 1 in the invention include, but are not particularly limited to, thermoplastic resins such as polyethylene terephthalate (PET), acryl resin, and ABS resin, in addition to polycarbonate.

Meanwhile, the transparent resin plate 1 is made of transparent resin (transparent polycarbonate). This makes it possible to visually recognize, from the outside surface 1b side of the transparent resin plate 1, the decorative layer 2 on the back surface 1a of the transparent resin plate 1. Note that if transparent, the transparent resin plate 1 may be colorless or colored.

The transparent resin plate 1 has a curved cross section when cut along the longitudinal direction. In addition, the thickness of the transparent resin plate 1 is formed in a substantially uniform manner in the longitudinal direction. Note that as used herein, the thickness of the transparent resin plate 1 is not particularly limited. Thus, to provide high strength, for instance, the transparent resin plate 1 may be set to be thick or to have a desired thickness.

The decorative layer 2 is a thin layer on which an ink is adhered on the back surface 1a of the transparent resin plate 1. Note that the ink used for the decorative layer 2 is not particularly limited and is desirably easy to adhere to a transparent resin plate 1-forming material (polycarbonate in this embodiment).

As shown in FIG. 1, the decorative layer 2 is divided into two regions including a first decorative layer 2a and a second decorative layer 2b, which differ in their colors. Thus, to improve a design of the outer plate panel 100, it is possible to avoid mounting a design member (e.g., a molding) on the outer plate panel 100 (transparent resin plate 1).

The pedestal member 3 is an approximately rectangular, plate-shaped part and is to mount the on-vehicle part 4 on the outer plate panel 100 (transparent resin plate 1). In addition, the pedestal member 3 plays a role of improving the strength of a site where the weight of the on-vehicle part 4 is imposed on the outer plate panel 100. Further, an increase in the area of bonding to the outer plate panel 100 by using a larger pedestal member 3 makes it possible to reduce a load per unit area acting on the outer plate panel 100.

The pedestal member 3 is fixed, using a double coated tape 7, to the back surface of the decorative layer 2. Note that for each adhesion layer (not shown) of the double coated tape 7, those which do not dissolve an ink of the decorative layer 2 are used.

In addition, examples of a method for fixing the pedestal member 3 to the decorative layer 2 include a method for bonding with, other than the double coated tape 7, the same kind of transparent ink as used for the formation of the decorative layer 2 or a method for bonding with a pressure-sensitive adhesive.

The pedestal member 3 is made of thermoplastic resin. Specifically, the pedestal member 3 is made of polycarbonate. Thus, the pedestal member 3, together with the transparent resin plate 1, is deformed during the below-described pressure molding step.

Figure 2:
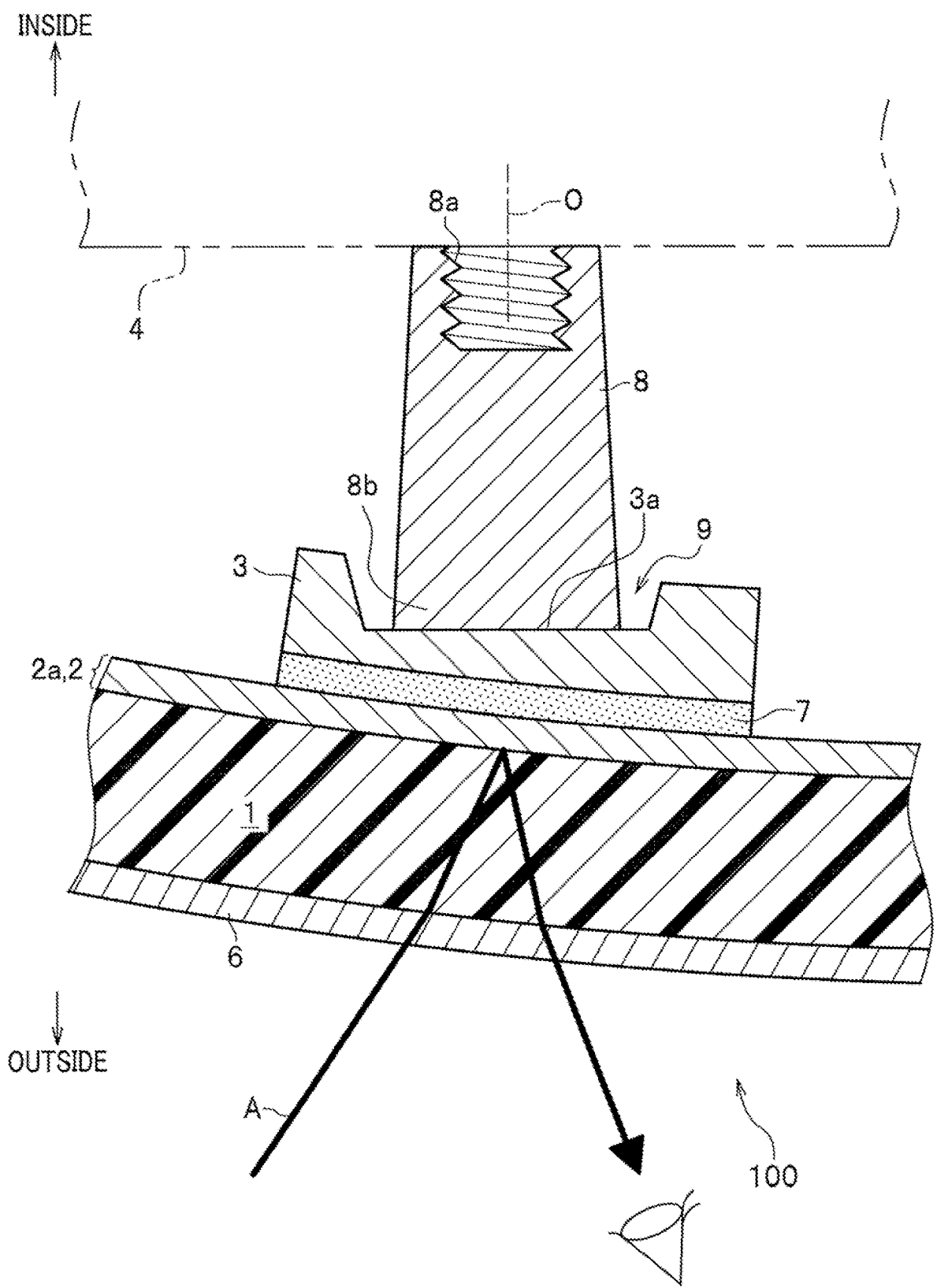
FIG. 2 is a magnified view of a region boxed by the frame line II in FIG. 1.

Three pedestal members 3 are provided so as to disperse the weight of the on-vehicle part 4 into three sites. In addition, a boss 8, where a bolt is used to secure the on-vehicle part 4, is bonded to the back surface of the pedestal member 3. Note that a tip of the boss 8 has a female threaded portion 8a (see FIG. 2).

The back surface of the pedestal member 3 has a notch 9, where a seat surface (flat surface) 3a used to bond a base portion 8b of the boss 8 is formed. In addition, each seat surface 3a is in parallel to one another.

This causes each boss 8, which is bonded to each seat surface 3a, to extend in the same direction and as a result of which the center axis (see axis O in FIG. 1) of each bolt (not shown) screwed into each female screw hole 8a is directed in the same direction.

Examples of the on-vehicle part 4 include, but are not herein particularly limited to, an electric component such as a harness or a lighting body such as a lamp.

The stiffener 5 is a plate-shaped part that reinforces the outer plate panel 100 (transparent resin plate 1) and is thinner than the pedestal member 3, and is bonded, using a double coated tape 7, to the inner side of the decorative layer 2. In addition, the stiffener 5 extends along the outer plate panel 100 and is formed as a rectangular shape (band shape).

The stiffener 5 is made of thermoplastic resin. Specifically, the stiffener 5 is made of polycarbonate. Thus, the stiffener 5, together with the transparent resin plate 1, is deformed during the below-described pressure molding step.

The protective layer 6 is a transparent layer that prevents damage on the outside surface 1b of the outer plate panel 100 (transparent resin plate 1) and improves weather resistance of the transparent resin plate 1.

Next, a method for manufacturing the outer plate panel 100 will be described with reference to FIGS. 3 and 4.

The outer plate panel 100-manufacturing method includes a protective layer-forming step, a decorative layer-forming step, a pedestal member-fixing step, a stacking step, a pressure molding step, a cutting step, a boss-bonding step, and a stationary part-mounting step.

Although not particularly depicted, the protective layer-forming step is a step of applying and curing, on the outside surface 1b side of the transparent resin plate 1, a raw material for the protective layer 6 to form the protective layer 6.

Note that if the protective layer-forming step is carried out before the pressure molding step, a crack in the protective layer 6 may occur when the transparent resin plate 1 is deformed (stretched) during the pressure molding step. Thus, a portion where the crack occurs should not have the protective layer 6 at this stage and the protective layer 6 is formed by, for instance, spraying after the pressure molding step.

Figure 3A:
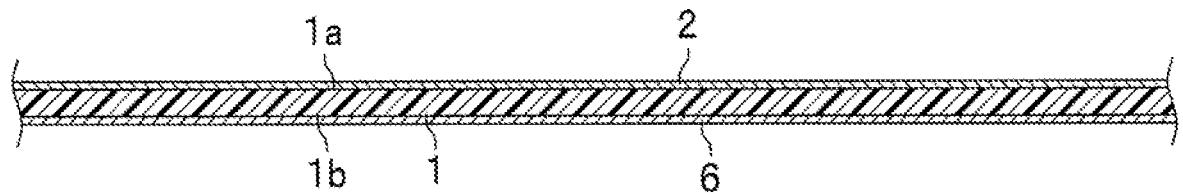
FIG. 3A is a diagram illustrating a decorative layer-forming step.

As shown in FIG. 3A, the decorative layer-forming step is a step of forming, on the back surface 1a of the transparent, flat, transparent resin plate (polycarbonate plate) 1, the decorative layer 2 by screen printing.

Here, the formation is carried out while taking into consideration deformation of the transparent resin plate 1 from a flat shape into a curved shape by the pressure molding step, namely, deformation (extension) of the decorative layer 2 formed on the transparent resin plate 1 by pressure molding.

Figure 3B:
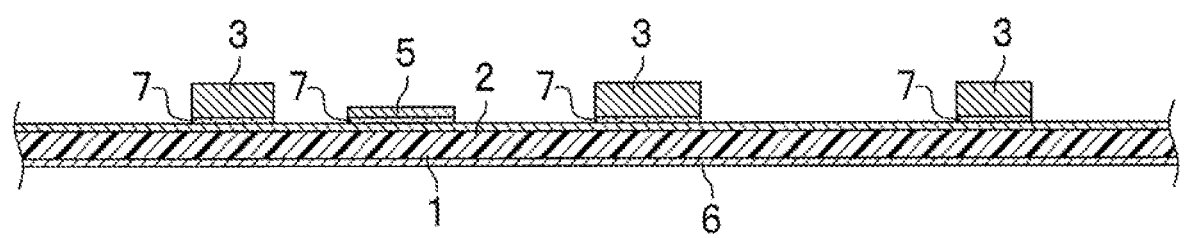
FIG. 3B is a diagram illustrating a pedestal member-fixing step.

As shown in FIG. 3B, the pedestal member-fixing step is a step of fixing the pedestal member 3 to the back surface 1a side of the transparent resin plate 1. In the pedestal member-fixing step in this embodiment, the pedestal member 3, which has been pre-cut into an approximately rectangular shape, is bonded, using the double coated tape 7, to the back surface of the decorative layer 2. In addition, in this step, the stiffener 5 is also bonded.

Figure 3C:
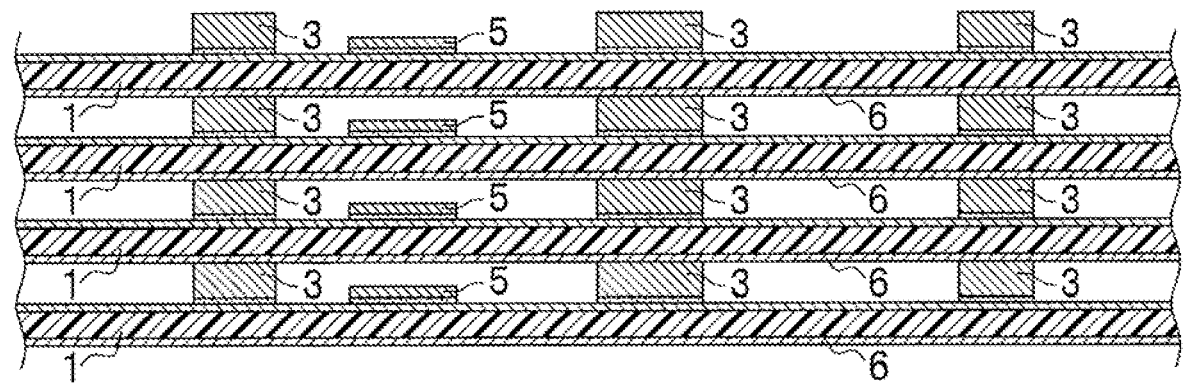
FIG. 3C is a diagram showing a state in which transparent resin plates after the pedestal member-fixing step are stacked.

As shown in FIG. 3C, the stacking step is a step of stacking, in sequence, the transparent resin plates 1 after the pedestal member-fixing step. This step enables a space occupied by the transparent resin plates 1 to be narrow, thereby increasing productivity. Meanwhile, because the pedestal members 3, etc., are interposed between the respective stacked transparent resin plates 1, it is possible to prevent the decorative layer 2 from being damaged or worn.

Note that in order to prevent the stacked transparent resin plates 1 from disintegrating during the stacking step, it is necessary to use at least three pedestal members 3 with the same thickness for the bonding, to set relative positions at which an upper-side transparent resin plate 1 can be supported by the three pedestal members 3, and to make the thickness of each stiffener 5 thinner than that of the three pedestal members 3.

Figure 3D:
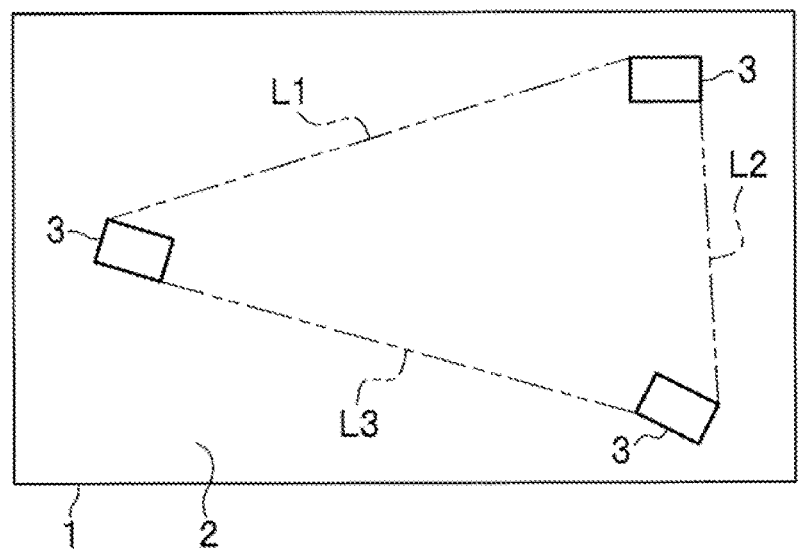
FIG. 3D is a diagram illustrating a case where pedestal members are in relative positions at which an upper-side transparent resin plate can be supported.
Figure 3E:
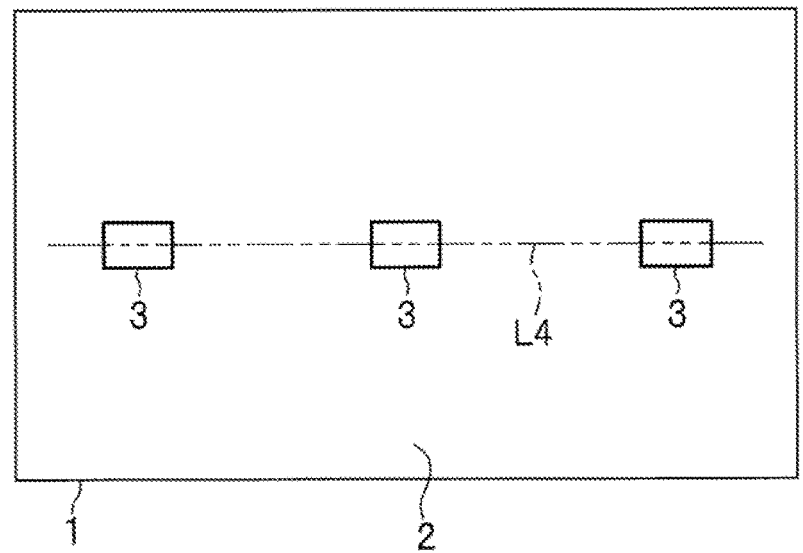
FIG. 3E is a diagram illustrating a case where pedestal members are in relative positions at which an upper-side transparent resin plate cannot be supported.

Here, the relative positions at which an upper-side transparent resin plate 1 can be supported by three pedestal members 3 means the case where a shape structured by the straight lines L1, L2, and L3 connecting the respective pedestal members 3 is a triangle as shown in FIG. 3D. Here, in the case where the respective pedestal members 3 are positioned on substantially the same straight line L4 as shown in FIG. 3E, the upper-side transparent resin plate 1 cannot be stably supported. Thus, this case is not included.

The pressure molding step is a step of molding the transparent resin plate 1 having the decorative layer 2 into a prescribed shape through pressure molding.

Specifically, in the pressure molding step, the transparent resin plate 1, together with the pedestal members 3, is first softened by heating. Next, a female mold (lower mold) 200 is provided on the outside surface 1b side of the transparent resin plate 1.

Figure 4A:
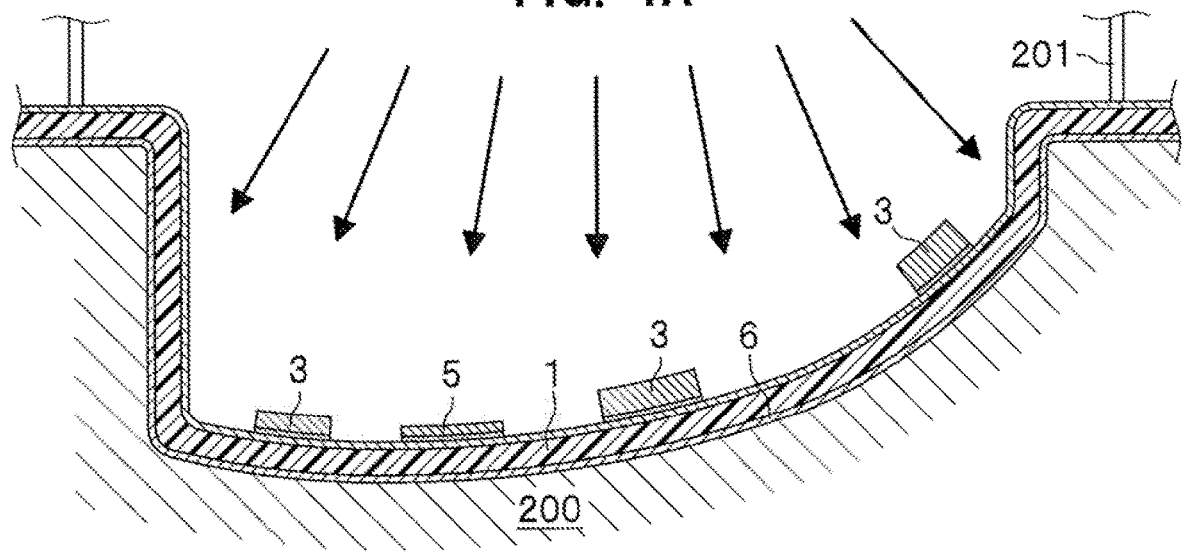
FIG. 4A is a diagram illustrating a pressure molding step.

Then, a space between the transparent resin plate 1 and the female mold 200 is vacuumed using vacuum equipment (not shown) as well as a pressuring box 201 is arranged on the back surface 1a side of the transparent resin plate 1 to pressurize the back surface 1a of the transparent resin plate 1 (see the arrows in FIG. 4A). Accordingly, the transparent resin plate 1 is pushed onto the female mold 200. This causes the transparent resin plate 1 to have a shape of the female mold 200 as shown in FIG. 4A. Finally, the transparent resin plate 1 is cooled, cured, and then removed from the mold.

Note that according to the pressure molding, the mold is only the female mold 200. As a result, the mold cost is lower than the case of injection molding where the formation requires a complicated mold including a male mold and a female mold.

Note that in this embodiment, the pedestal member-fixing step is carried out before the pressure molding step; but in the invention, the pedestal member-fixing step may be carried out after the pressure molding step.

Provided that when the pedestal member-fixing step is carried out after the pressure molding step, curved pedestal members 3 and stiffeners 5 are bonded to the curved transparent resin plate 1; this decreases the strength of bonding to the transparent resin plate 1 because the curved surfaces are contact surfaces and are difficult to mate.

Thus, as described in the embodiment, the pedestal member-fixing step should be carried out before the pressure molding step, and the pedestal members 3 and the stiffeners 5, together with the transparent resin plate 1, should be deformed by pressure molding.

Also, when the pedestal member 3 bonding strength is further intentionally increased, the method includes making each pedestal member 3 larger to enlarge the area of bonding to the transparent resin plate 1.

Figure 4B:
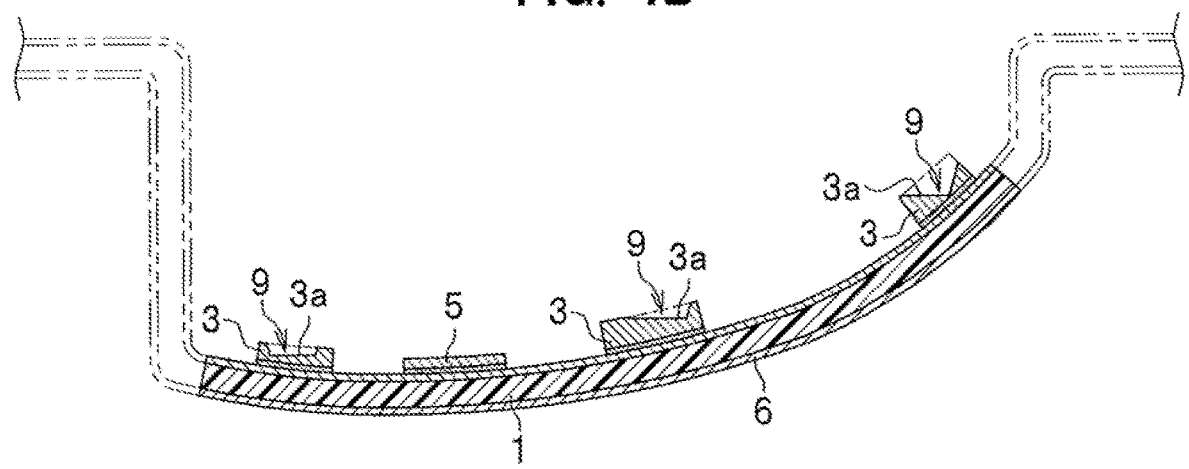
FIG. 4B is a diagram illustrating a cutting step.

As shown in FIG. 4B, the cutting step is a step of cutting the transparent resin plate 1 and the pedestal members 3. Specifically, during the cutting step, unwanted portions (see the alternate long and two short dashes lines in FIG. 4B) in the transparent resin plate 1 are cut to complete the outer plate panel 100.

In addition, in this step, a notch 9 (seat surface 3a) on the back surface of each pedestal member 3 is also formed. Note that use of the pedestal member 3 on which the seat surface 3a is originally formed may cause the position of the seat surface 3a of the pedestal member 3 to change after the pressure molding step or may cause the seat surface 3a to be bent.

Meanwhile, according to this embodiment, the notch 9 (seat surface 3a) is formed after the pressure molding step. Thus, the seat surface 3a can be desirably positioned and the flatness of the seat surface 3a can be secured. Besides, the setting position and orientation of the boss 8 can be set with precision and the strength of bonding to the corresponding pedestal member 3 can be enhanced.

Figure 4C:
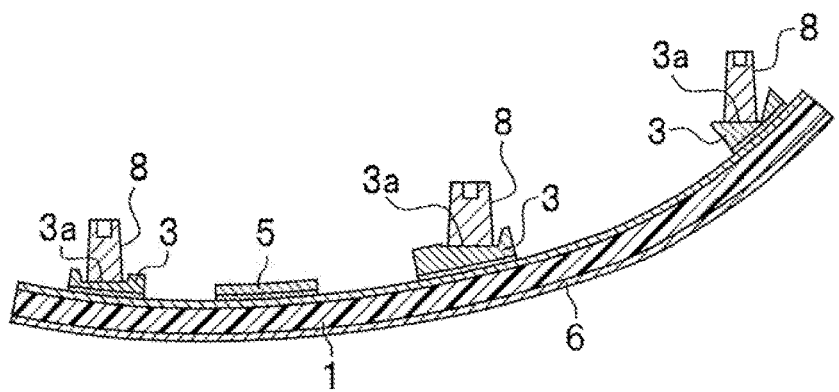
FIG. 4C is a diagram illustrating a boss-bonding step.

As shown in FIG. 4C, the boss-bonding step is a step of bonding the boss 8 to the seat surface 3a of the pedestal member 3 by using an adhesive.

Although not particularly depicted, the stationary part-mounting step is a step pf arranging the on-vehicle part 4 on the back surface (back surface 1a of the transparent resin plate 1) side of the outer plate panel 100 and securing the on-vehicle part 4 by using a bolt to fix the on-vehicle part 4 to the outer plate panel 100.

This causes the on-vehicle part 4 to be integrated with the outer plate panel 100. Accordingly, a step of assembling the outer plate panel 100 on a vehicle body and then attaching the on-vehicle part 4 thereto can be omitted, so that the productivity can be increased.

Collectively, according to the embodiment, the outer plate panel 100 can be produced using the transparent resin plate 1 molded through pressure molding and the decorative layer 2 formed through screen printing. Thus, the configuration can be simple.

In addition, the pressure molding can cause the transparent resin plate 1 to have a shape with a high degree of freedom, that is, a shape with an enhanced design. Further, the screen printing can offer various designs. Thus, it is possible to provide an outer plate panel 100 with an enhanced design.

Further, the screen printing causes the decorative layer 2 to be formed on the flat transparent resin plate 1. Accordingly, this case may be easier than the case where a decorative layer is formed on a post-molding part (a curved/bent part such as a corner part), and as a result of which the productivity can be increased.

Furthermore, it is unnecessary to separately produce a resin molding and mount the molding on the outer plate panel 100 (transparent resin plate 1) as described in the Background Art. This can reduce the number of parts.

Meanwhile, according to the embodiment, the decorative layer 2 is positioned on the side (inner side) deeper than the transparent resin plate 1. Thus, when seen from the outside, the decorative layer 2 can be visually recognized through the transparent resin plate 1 as shown in the arrow A in FIG. 2. Accordingly, the decorative layer 2 exhibits a beautiful appearance with depth. Hence, this decorative layer 2 can give a beautiful appearance different from a decorative layer coated on the outside surface of a conventional steel outer plate panel, and excels in design.

In addition, according to this embodiment, the pedestal members 3 are formed on the back surface 1a of the transparent resin plate 1. Thus, it is possible to avoid creating a female screw hole in the back surface 1a of the transparent resin plate 1 and then fixing the on-vehicle part 4 by using a bolt. In other words, it is possible to prevent the design to be damaged by creating a female screw hole in a part of the decorative layer 2. Thus, the outer plate panel 100 design can be retained.

As described above, the first embodiment has been illustrated. However, the invention is not limited to this embodiment.

Figure 5A:
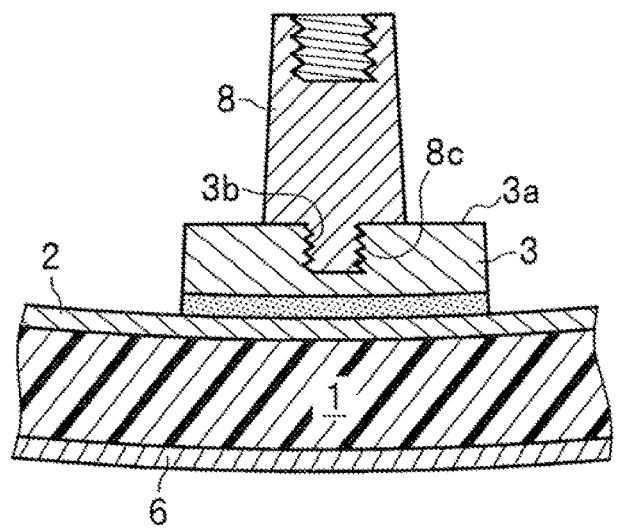
FIG. 5A is a diagram showing a state in which a boss is screwed into a pedestal member.
Figure 5B:
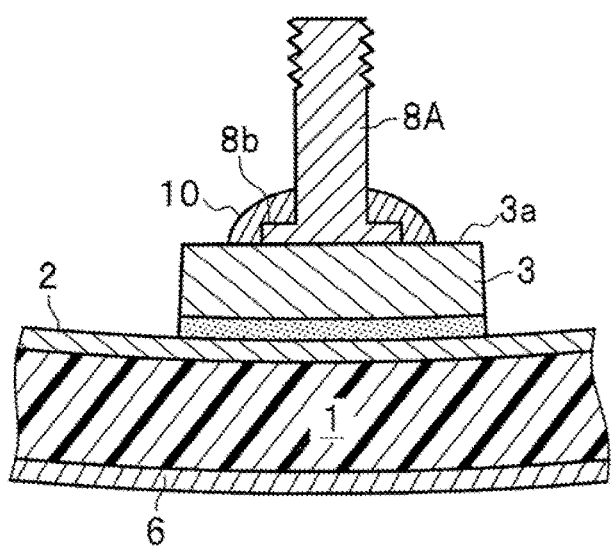
FIG. 5B is a diagram showing a state in which a statvolt is bonded to a pedestal member.

In this embodiment, an adhesive is used to fix the boss 8 to the seat surface 3a of each pedestal member 3. However, in the invention, as shown in FIG. 5A, a female screw hole 3b may be created in the seat surface 3a of the pedestal member 3 and a male thread 8c of the boss 8 may be screwed into the female screw hole 3b. Alternatively, as shown in FIG. 5B, an acrylic resin 10 may be applied onto the seat surface 3a of the pedestal member 3 and the acrylic resin 10 may be cured by UV irradiation. Accordingly, a base portion 8b of a statvolt 8A may be immobilized.

Meanwhile, in this embodiment and the above modification embodiment, the boss 8 or the statvolt 8A is used to fix the on-vehicle part 4. However, in the invention, the on-vehicle part 4 may be directly fixed, without using the boss 8 or the statvolt 8A, to the seat surface 3a of the pedestal member 3.

Figure 5C:
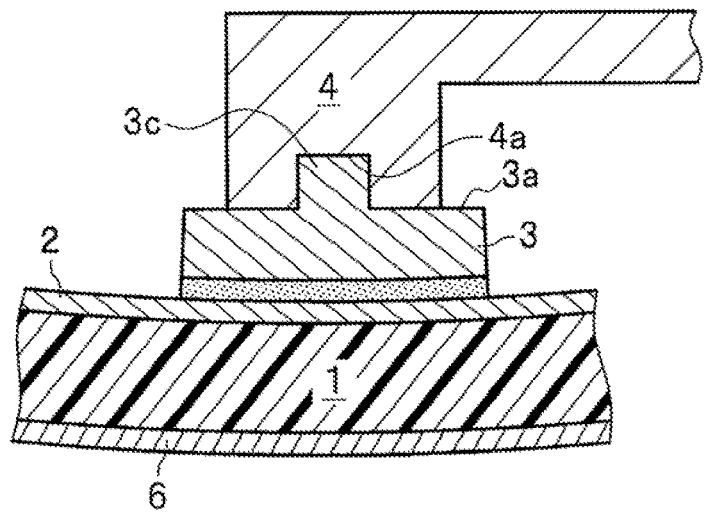
FIG. 5C is a diagram showing a state in which an on-vehicle part is directly immobilized onto a pedestal member.

Specifically, as show in FIG. 5C, a protrusion part 3c may be formed on the seat surface 3a of the pedestal member 3, a recess part 4a of the on-vehicle part 4 may be engaged with the protrusion part 3c, and an adhesive (not shown) may then be used for bonding.

In addition, although not particularly depicted, a female screw hole may be created in the seat surface 3a of the pedestal member 3 and a bolt for securing the on-vehicle part 4 may be screwed into the female screw hole.

Figure 3F:
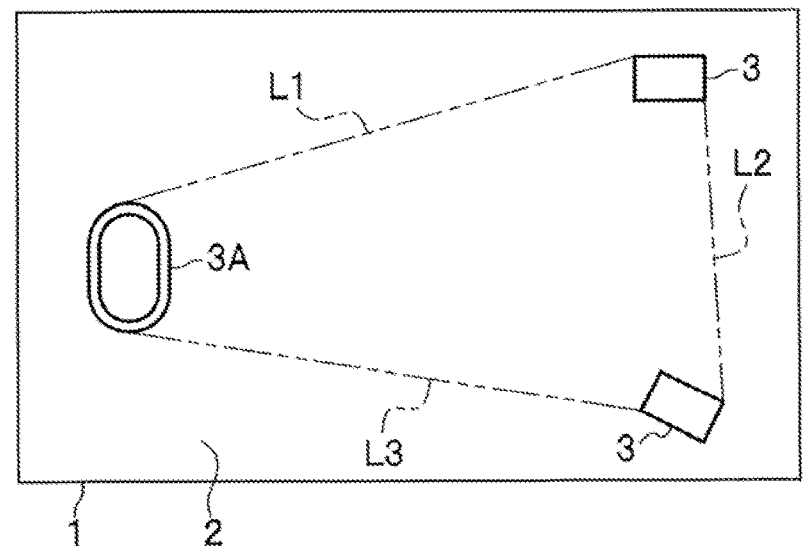
FIG. 3F is a diagram illustrating a case of relative positions at which an annular pedestal member and two rectangular pedestal members are used to be able to support an upper-side transparent resin plate.

Meanwhile, in this embodiment, a rectangular pedestal member 3 is used. However, the shape may be, for instance, linear. Alternatively, as shown in FIG. 3F, an annular pedestal member 3A may be used. According to such an annular pedestal member 3A, when an annular flange is formed on a housing (not shown) that supports the on-vehicle part 4, for instance, the whole circumference of this flange can be fixed to the annular pedestal member 3A. In addition, when the annular pedestal member 3A and the other two rectangular pedestal members 3 have the same thickness and a shape structured using the straight line L1, L2, and L3 connecting the respective pedestal members 3 and 3A is a triangle during the outer plate panel 100-manufacturing step, the transparent resin plate 1 is resistant to disintegration even if the transparent resin plates 1 after the pedestal member-fixing step are stacked (see FIG. 3C). Hence, the productivity can be improved.

Meanwhile, in this embodiment, the decorative layer 2 is formed on the back surface 1a of the transparent resin plate 1. In the invention, however, the decorative layer 2 may be formed on the outside surface 1b of the transparent resin plate 1. This is because even in such a case, the structure of the outer plate panel 100 is simple and the outer plate panel 100 with an enhanced design can be provided. Note that the decorative layer 2 formed on the outside surface 1b of the transparent resin plate 1 cannot give a beautiful appearance with depth.

In addition, in this embodiment, the decorative layer 2 is formed through screen printing. However, it is possible to form, other than this decorative layer 2, an electric wire for supplying electricity by using a highly conductive ink or to form an electric wire for defrosting by heating a window. That is, in the invention, screen printing may be used to form an electric wire on the transparent resin plate 1 or the decorative layer 2. Also, when such an electric wire is formed, it is preferable that the electric wire is formed on the back surface of the decorative layer 2 so as to make it difficult to visually recognize the electric wire from the outside.

Further, in this embodiment, the protective layer-forming step is carried out before the pressure molding step. However, the protective layer-forming step may be carried out after the pressure molding step.

Figure 6A:
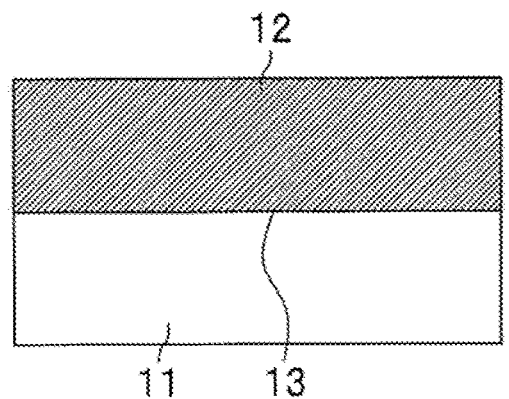
FIG. 6A is a diagram showing a boundary line state of adjacent decorative layers formed by screen printing before a pressure molding step.
Figure 6B:
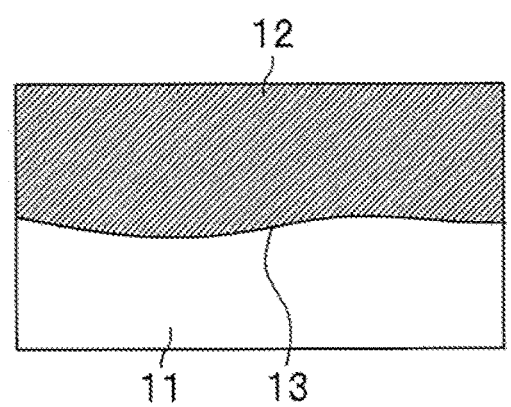
FIG. 6B is a diagram showing a boundary line state after the pressure molding step.

Furthermore, as shown in FIG. 6A, after the decorative layer-forming step, a boundary line 13 between the first decorative layer 11 and the second decorative layer 12 is formed straight. However, as shown in FIG. 6B, after the pressure molding step (transparent resin plate 1 deformation), the boundary line 13 may be curved.

Figure 6C:
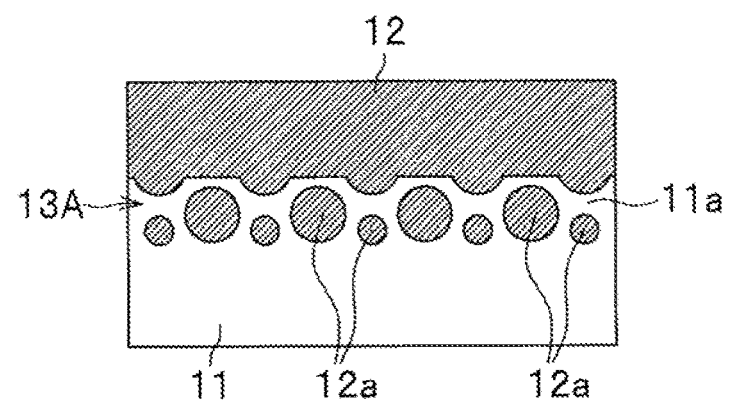
FIG. 6C is a diagram showing a boundary state after gradation processing.

As a countermeasure, provided is a method of subjecting a boundary between decorative layers to gradation. Specifically, as shown in FIG. 6C, a plurality of circles 12a with the same color as the second decorative layer 12, for instance, are formed and the first decorative layer 11 is formed so as to fill in gaps 11a between the second decorative layer 12 and the circles 12a. In this way, a boundary 13A is subject to gradation. Even if the boundary 13A is curved after the pressure molding step, this can make the curved boundary 13A unidentifiable.

Figure 7A:
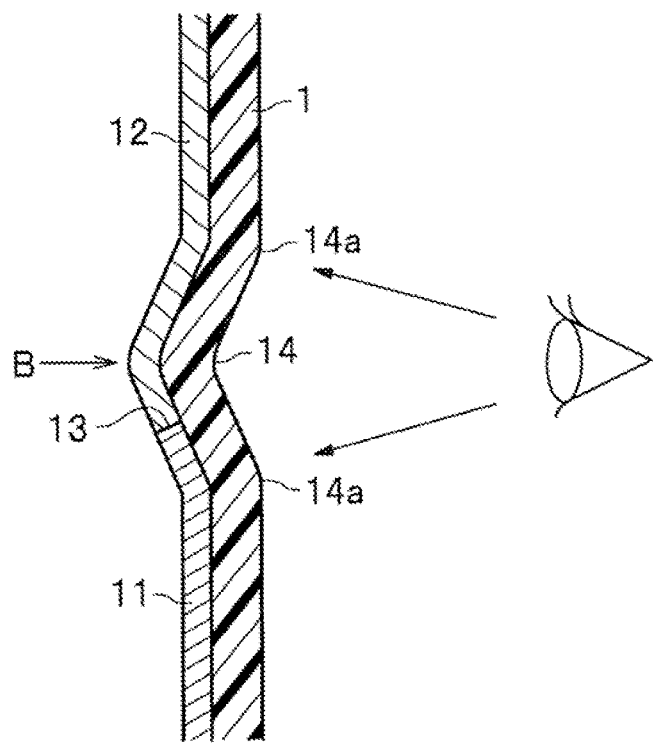
FIG. 7A is a diagram illustrating a state of a post-pressure-molding indented transparent resin plate when viewed from the outside surface side.
Figure 7B:
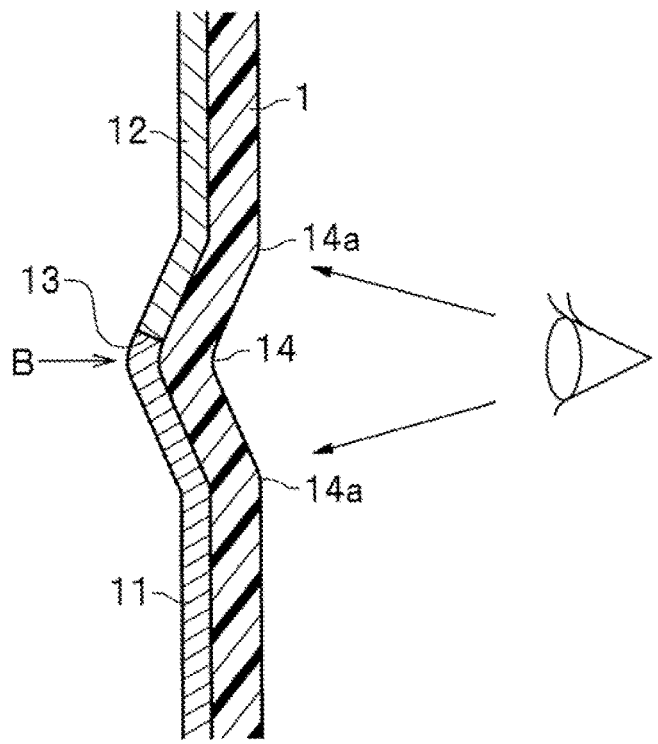
FIG. 7B is a diagram illustrating a state of a post-pressure-molding indented transparent resin plate when viewed from the outside surface side.

Alternatively, the transparent resin plate 1 may have a recessed portion extending while corresponding to the boundary line between the decorative layers. Specifically, as shown in FIGS. 7A and 7B, a recessed portion 14 extending along the boundary line 13 may be formed on the transparent resin plate 1. Accordingly, the boundary line 13 is positioned backward and two ridgelines 14a and 14a, between which the boundary line 13 is present, are formed on the transparent resin plate 1.

As a result, even if the boundary line 13 is curved and the boundary line 13 is deviated from a prescribed position (see the arrows B in FIGS. 7A and 7B), the proximal ridgelines 14a and 14a are more easily visually recognized than the boundary line 13. This can prevent one from visually focusing on the boundary line 13.

Second Embodiment

Next, an embodiment of applying the invention to an outer plate panel 20 of a tail gate 120 will be described. Here, in this embodiment, the outer plate panel 20 has a light-transmissive transparent part.

Figure 8A:
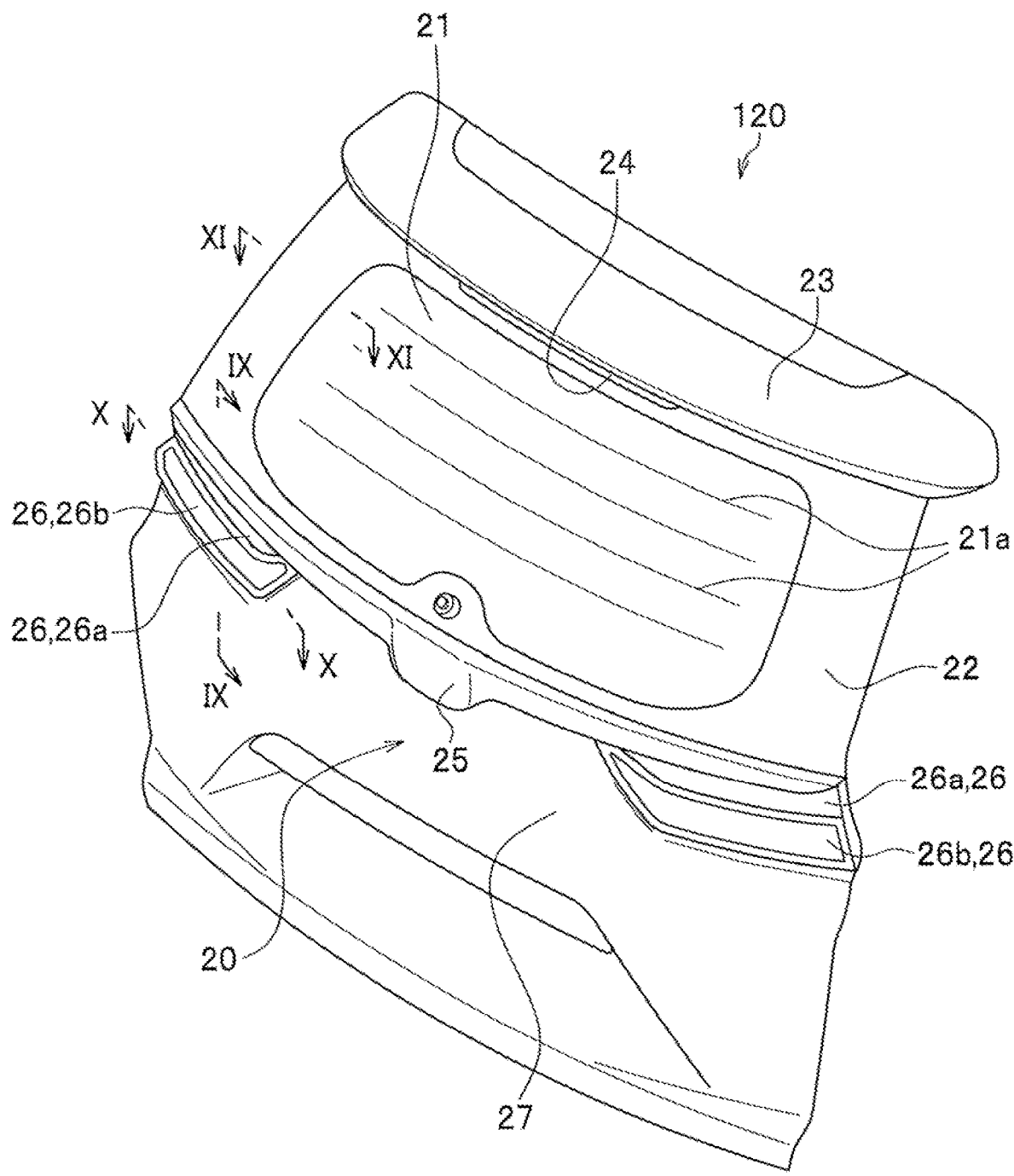
FIG. 8A is a perspective view of a tail gate when viewed from the rear upper right side.

As shown in FIG. 8A, the tail gate 120 is a door that opens and closes a rear opening (not shown) of a vehicle. The tail gate 120 is provided with a frame member 121 constituting a framework (see FIGS. 10 and 11) and the outer plate panel 20 that is provided on the outer side of the frame member 121 and constitutes a vehicle rear surface.

The outer plate panel 20 is approximately rectangular when viewed from the rear side, and the outline is shaped as the same as the vehicle rear opening (not shown).

Figure 9:
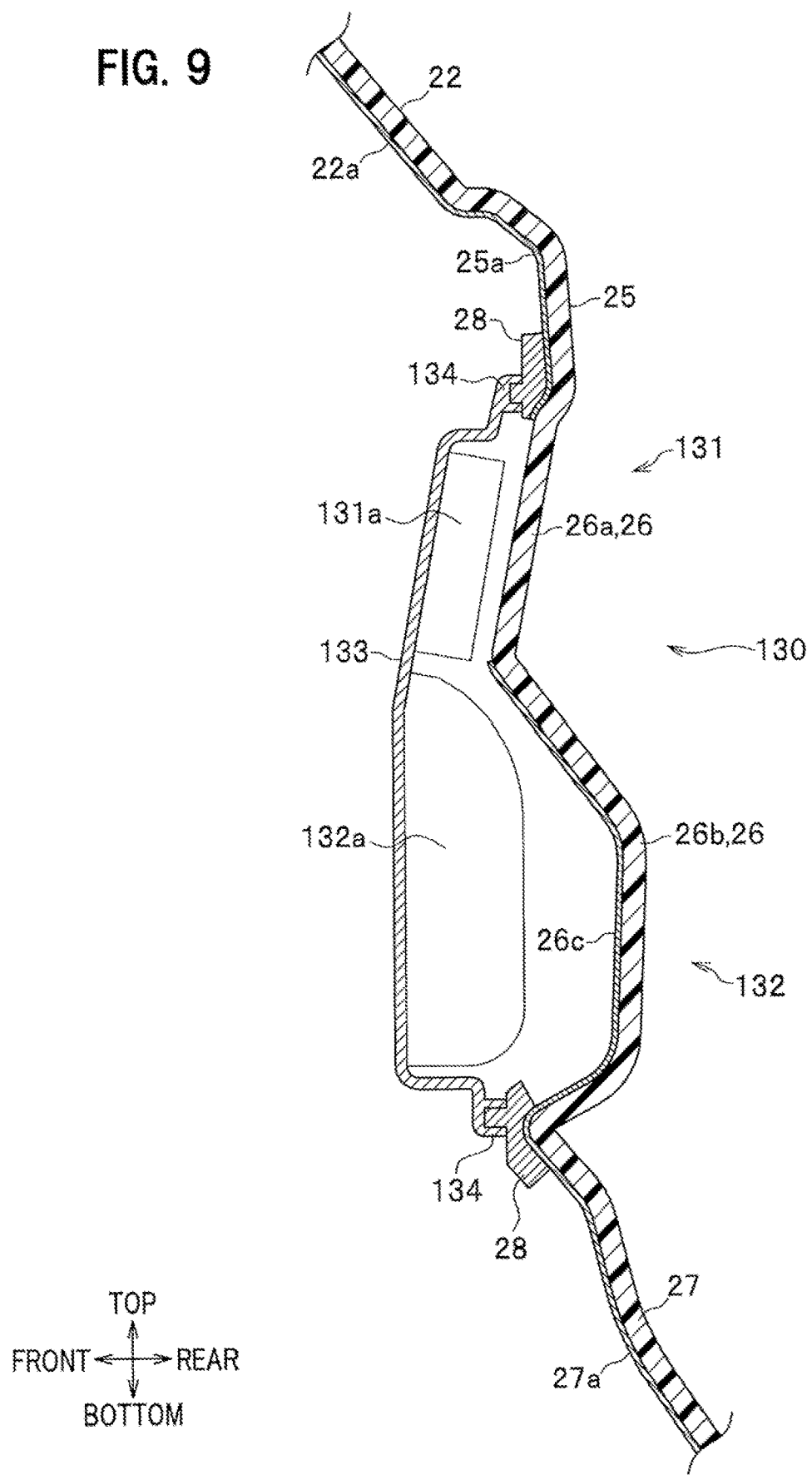
FIG. 9 is a sectional view cut along the arrowed line IX-IX in FIG. 8A.

The outer plate panel 20 includes: a window part (transparent part) 21; a window frame part 22 surrounding the window part 21; a horizontal wall part 23 like a horizontal plate positioned upwardly of the window frame part 22; a lens (transparent part) 24 for a high mounted stop lamp positioned downwardly of the horizontal wall part 23; a molding 25 that is below the window frame part 22 and extends in the vehicle widthwise direction; lenses (transparent parts) 26 and 26 for rear combination lamps 130 positioned below the molding 25 at both ends; and a lower wall part 27 positioned below the molding 25. In addition, as shown in FIG. 9, each rear combination lamp 130 includes an upper-side tale lamp 131 and a lower-side strap lamp 132. Thus, the lens 26 is divided into an upper lens 26a and a lower lens 26b.

Figure 8B:
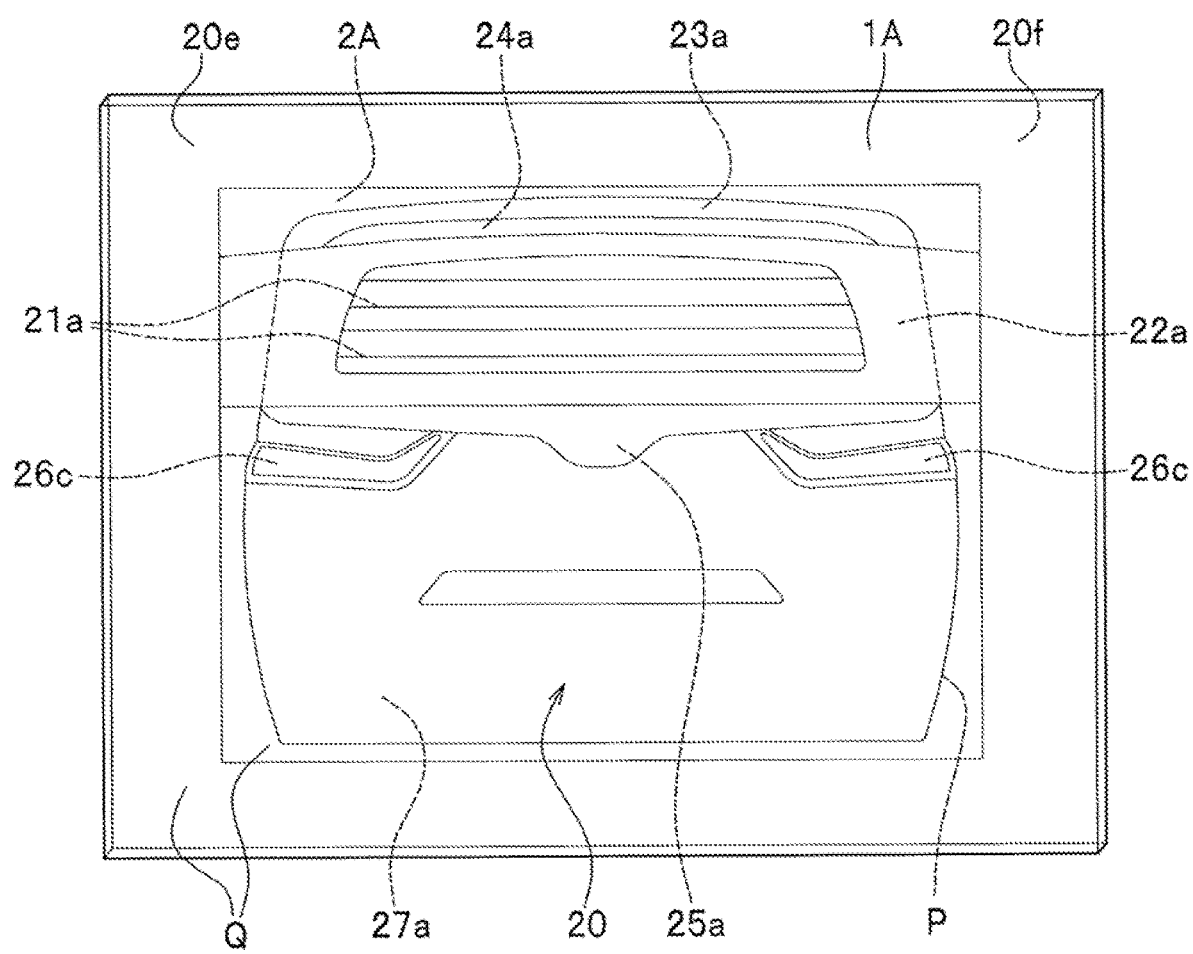
FIG. 8B is a front view of a pre-pressure-molding transparent resin plate when viewed from the outside surface side.

As shown in FIG. 8B, this outer plate panel 20 is produced by pressure-molding, into, for instance, a window part 21 or window frame part 22 shape, a flat transparent resin plate 1A having a protective layer (not shown) on an outside surface 20e and a decorative layer 2A on a back surface 20f and then by cutting the outer plate panel 20 along the outline P during the cutting step to remove an unwanted portion Q. Thus, one transparent resin plate 1A is used to form the respective parts including the window part 21, the window frame part 22, the horizontal wall part 23, the lens 24, the molding 25, the lenses 26 and 26, and the lower wall part 27 that constitute the outer plate panel 20, which parts are thus integrated.

In addition, as shown in FIG. 8B, the decorative layer 2A formed on the transparent resin plate 1A is selectively colored depending on each part including the window part 21, the window frame part 22, the horizontal wall part 23, the lens 24, the molding 25, the lenses 26 and 26, and the lower wall part 27. Otherwise, the decorative layer itself is not formed thereon. Hereinafter, the details will be described.

Regarding the decorative layer 2A on each site of the outer plate panel 20, the window frame part 22 has a black decorative layer 22a formed by screen printing as shown in FIG. 9. The molding 25 has a silver decorative layer 25a formed by screen printing.

The lower wall part 27 has a body-color decorative layer 27a formed by screen printing. The horizontal wall part 23 has a decorative layer 23a with the same color as of the lower wall part 27 (see FIG. 8B).

In addition, the lens 24 for a high mounted stop lamp has a red transparent decorative layer 24a formed by screen printing (see FIG. 8B). Accordingly, when a light-emitting section (not shown) of the high mounted stop lamp emits light, red light is emitted in a rear direction relative to the lens 24.

The window part 21 has no decorative layer. In addition, the back surface (inner surface) of the window part 21 has a plurality of electric heating wires 21a (see FIG. 8A) for defrosting the window part 21. Note that the electric heating wires 21a are formed by screen printing during the decorative layer-forming step.

As shown in FIG. 9, the upper lens 26a has no decorative layer. Thus, white or yellow light emitted from a light-emitting section 131a of the tale lamp 131 is emitted via the upper lens 26a in a rear direction.

The lower lens 26b has a red transparent decorative layer 26c. Thus, white light emitted from a light-emitting section 132a of the strap lamp 132 is emitted as red light in the rear direction.

Figure 10:
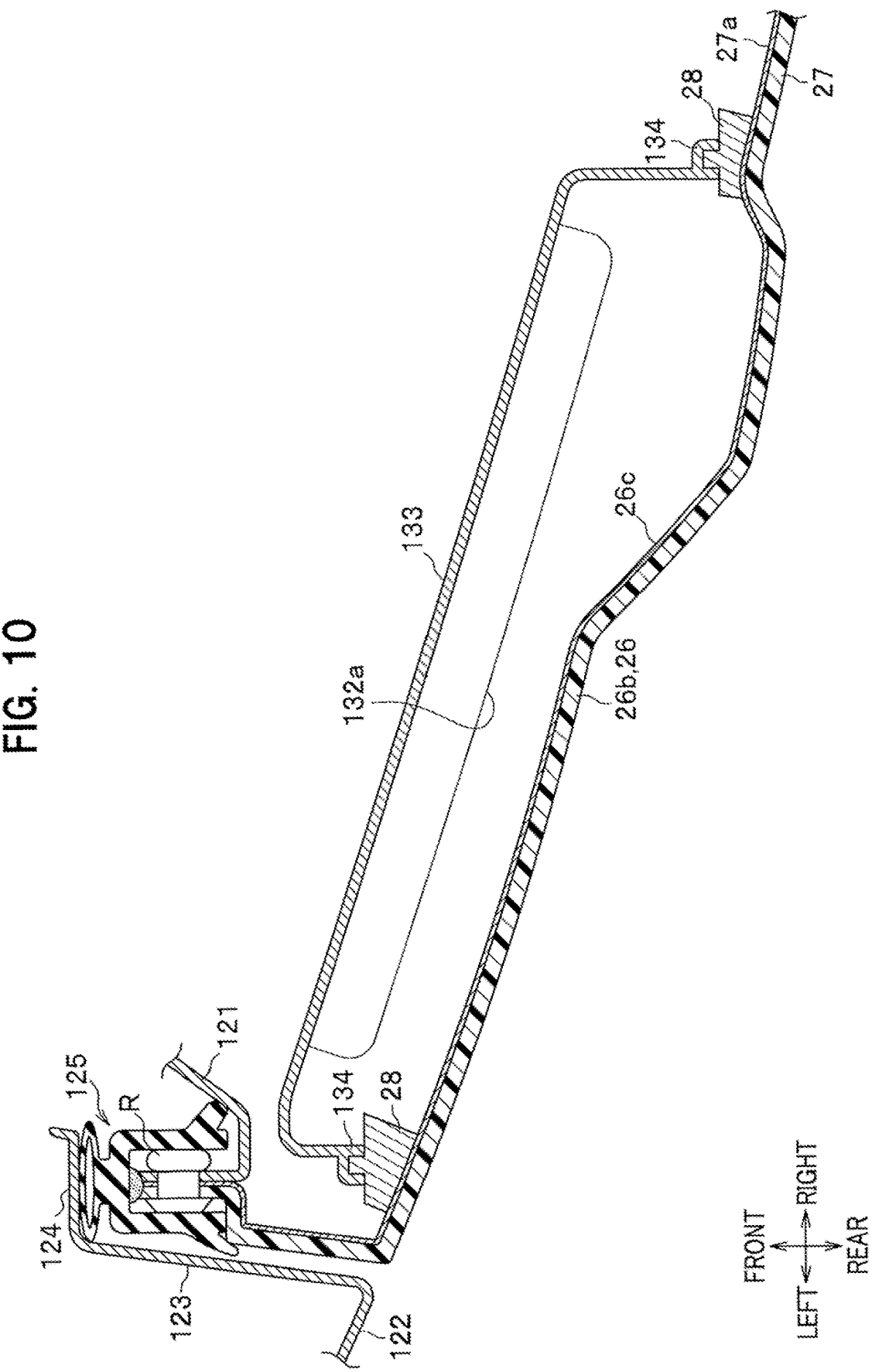
FIG. 10 is a sectional view cut along the arrowed line X-X in FIG. 8A.

Note that as shown in FIGS. 9 and 10, annular pedestal members 28, each having a protrusion part on the seat surface, are provided on peripheral portions of the lens 26 so as to fix a housing 133 for the tale lamp 131. Then, each end of the housing 133 has a recessed portion 134, which is engaged with the protrusion part of the pedestal member 28 so as to immobilize the housing 133.

Next, how to mount the outer plate panel 20 to the frame member 121 will be described in detail with reference to FIG. 11. Note that a rear bumper face 122 is a part arranged on the left side of the outer plate panel 20 shown in FIG. 11. An edge of this rear bumper face 122 has a front-rear wall section 123 extending forward and a left-right wall section 124 extending inwardly in the vehicle widthwise direction relative to the leading edge of the front-rear wall section 123.

Figure 11:
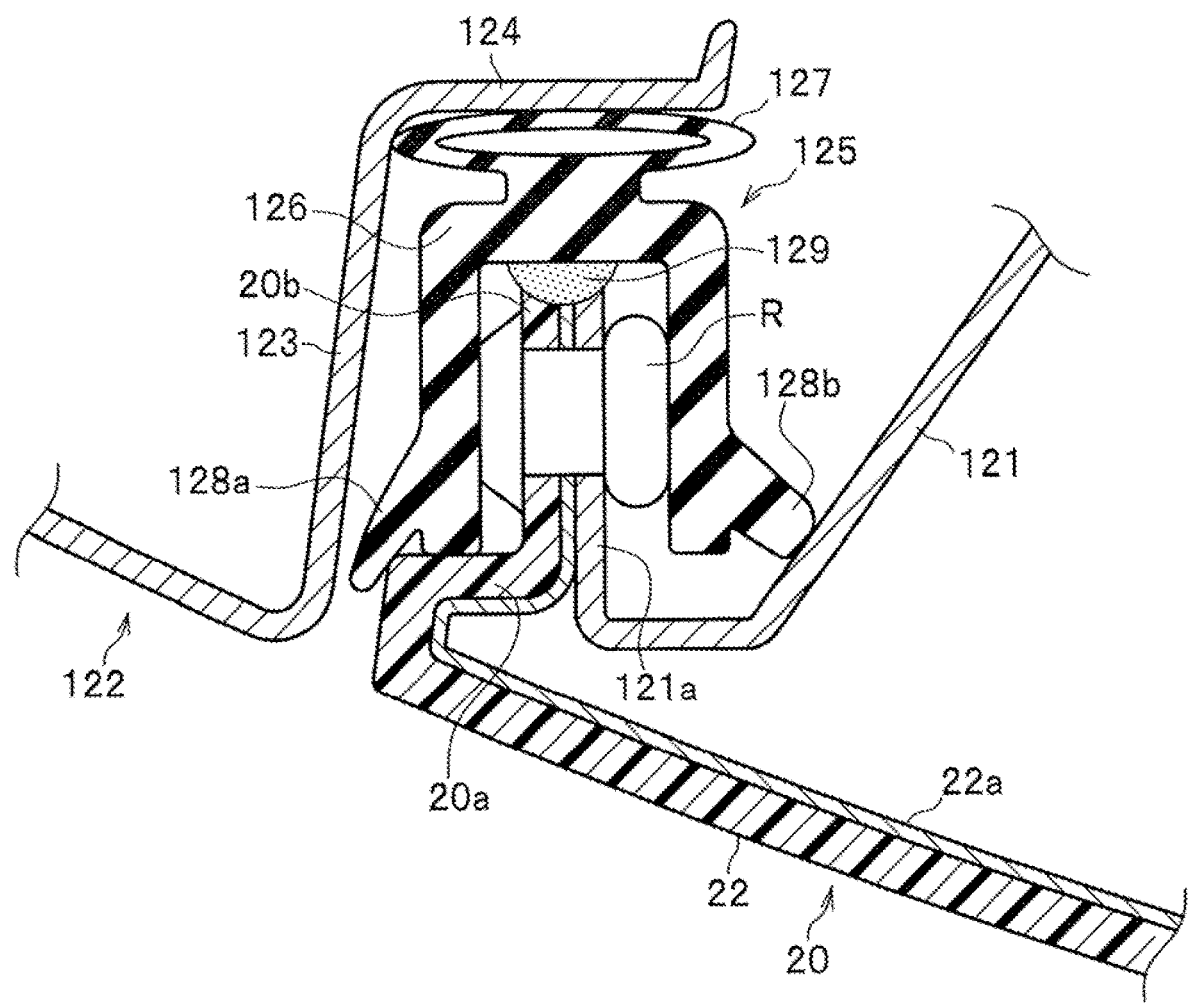
FIG. 11 is a sectional view cut along the arrowed line XI-XI in FIG. 8A.

As shown in FIG. 11, the outer plate panel 20 has a folded portion 20a that is folded inward (in the right direction in FIG. 11) on a back surface side from an edge portion and a mounting portion 20b that extends forwardly of the folded portion 20a and is mounted on a vehicle.

In addition, an edge portion 121a of the frame member 121 is folded forward and extends forward.

This edge portion 121a of the frame member 121 is attached to the inner side of the mounting portion 20b of the outer plate panel 20.

Then, the mounting portion 20b of the outer plate panel 20 and the edge portion 121a of the frame member 121 are secured using a rivet R. In this way, the outer plate panel 20 is fixed to the frame member 121.

Note that the frame member 121 and the outer plate panel 20 are attached using the rivet R. Thus, when the rivet R-mediated fastening is released, the outer plate panel 20 can be collected without damage.

In addition, the whole mounting portion 20b and edge portion 121a, which are fastened with the rivet R and integrated, are referred to as a mating surface (20b, 121a).

The mating surface (20b, 121a) is provided with a trim seal 125. The trim seal 125 includes: a main body 126, a cross section of which is shaped like a recess, that covers the mating surface; a tube 127 that is provided on the front surface of the main body 126; and an outer lip 128a and an inner lip 128b that are provided on lateral surfaces of the main body 126.

A sealing portion 129 made of an adhesive is formed between the leading edge of the mating surface (20b, 121a) and the main body 126. This seals a gap between the main body 126 and the mating surface (20b, 121a), thereby preventing infiltration of liquid into a cabin side.

Note that even if liquid infiltrates the gap between the main body 126 and the mating surface (20b, 121a), the inner lip 128b is in contact with the frame member 121. Thus, a flow path to the inside is sealed, so that a possibility of infiltration of liquid into a cabin side is very low.

The outer lip 128a is in contact with an outside end of the folded portion 20a of the outer plate panel 20, so that it is difficult for liquid to infiltrate the gap between the mating surface (20b, 121a) and the main body 126.

In addition, the tube 127 is pressured by the left-right wall section 124 of the rear panel 122 when the tail gate 120 is in a closed state. This makes it difficult for liquid and noise to enter the cabin side.

Collectively, the second embodiment can reduce the number of parts because it is unnecessary to separately produce a window glass, a lens (transparent part), a molding, etc.

In addition, the light-emitting section(s) is integrated (as a module(s)) in the outer plate panel 20. Thus, mounting of the tail gate onto a vehicle body can be carried out later in the final step. Accordingly, at the time of mounting onto the vehicle body, it is unnecessary to pay attention so as not to damage the outer plate panel (tail gate), thereby capable of increasing the productivity.

In addition, the folded portion 20a is formed and the mating surface (20b, 121a) and the rivet R are thus positioned behind the outer plate panel 20. This makes it difficult to visually recognize them from the vehicle rear side, thereby enhancing the design.

Meanwhile, in the conventional structure, the peripheral portion of a lens is supported by a housing and as a result of which the peripheral portion of a lens is not a light-emitting portion.

However, in this embodiment, as shown in FIG. 8A, the peripheral portion of the lens 26 continues to the adjacent molding 25 and lower wall part 27 and is not supported by the housing 133. Accordingly, light penetrates through the peripheral portion of the lens 26, and the peripheral portion can thus be a light-emitting surface.

Next, modification embodiments of the second embodiment will be described.

Figure 12:
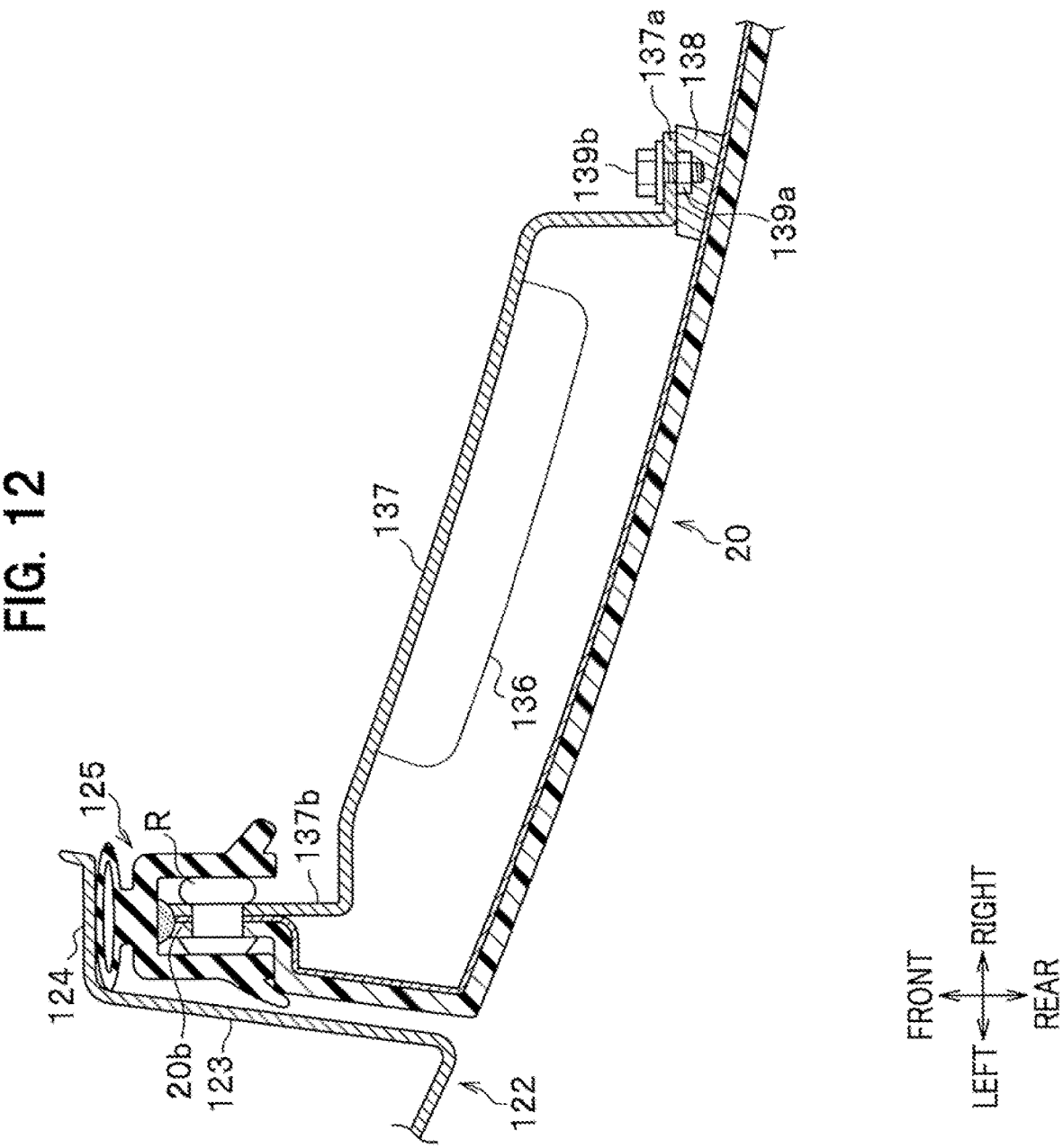
FIG. 12 is a diagram showing a state in which one end of a bracket is fixed with a rivet to a transparent resin plate.

As shown in FIG. 12, a bracket 137 that supports a part 136 may be provided on an end side of the outer plate panel 20. In this case, a bolt 139b is secured into a nut 139a provided on a pedestal member 138. In this way, an inner-side end portion 137a of the bracket 137 is immobilized. Further, a rivet R is made to penetrate so as to integrate an outer-side end portion 137b of the bracket 137 and the mounting portion 20b of the outer plate panel 20. Such a method may be used to fix the bracket 137 to the transparent resin 20.

Figure 13:
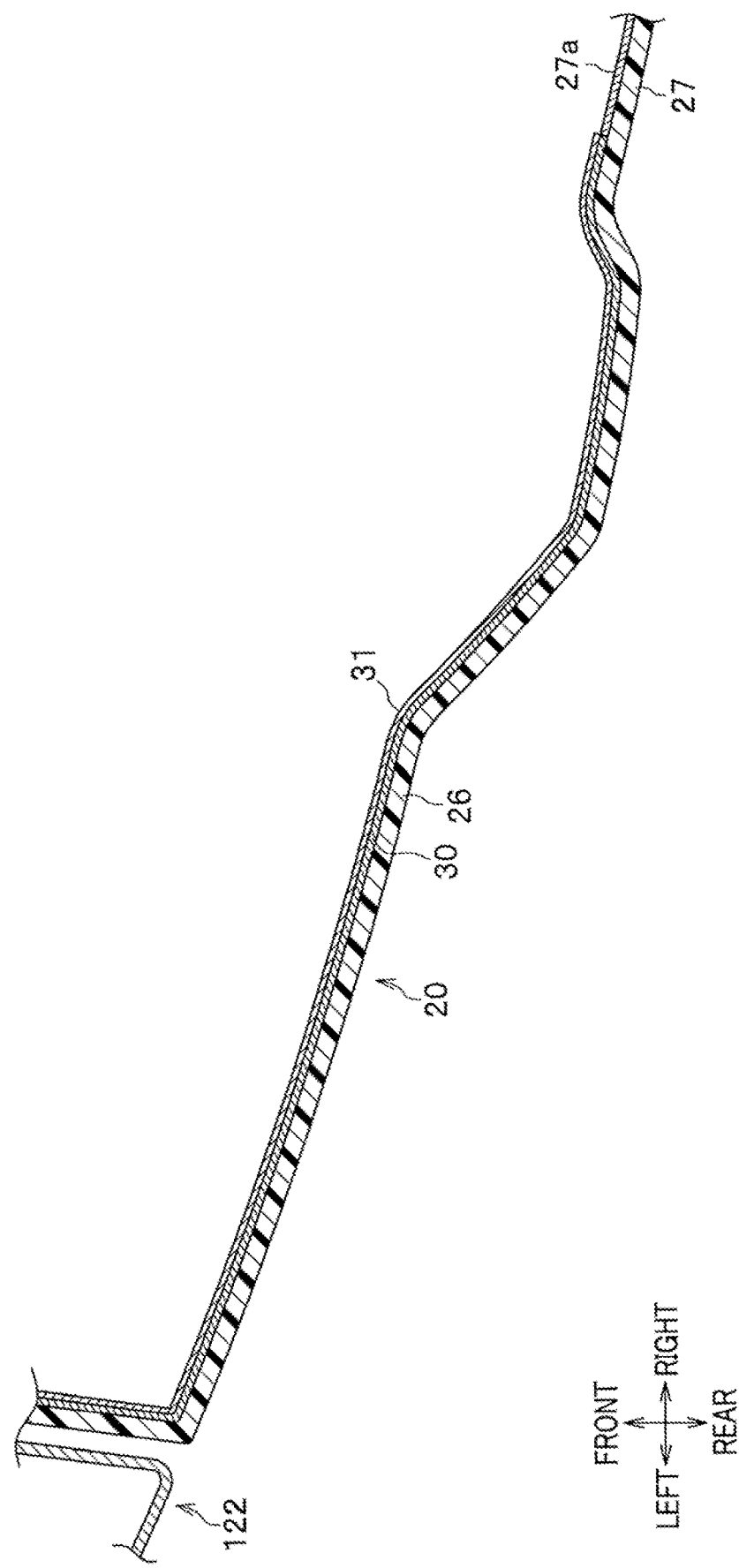
FIG. 13 is a diagram showing an embodiment of using an LED sheet for a rear combination lamp.

As shown in FIG. 13, the back surface of the lens 26 (transparent part) may be provided with a prism sheet (refractive sheet) 30 and the back surface of the prism sheet 30 may be further provided with an organic EL sheet 31.

This can avoid use of the pedestal member 28 for supporting the housing 133. In addition, the prism sheet 30-penetrating light is reflected, so that the design can be improved.

In addition, the outer plate panel 20 constituting the lens (transparent part) 26 may be irradiated with a laser beam. Alternatively, light-reflecting roughness may be formed by grinding with a router. Otherwise, a light-guiding panel may be provided instead of the prism sheet 30.

Third Embodiment

Next, an application to a front fender panel on the left side will be described.

Figure 14:
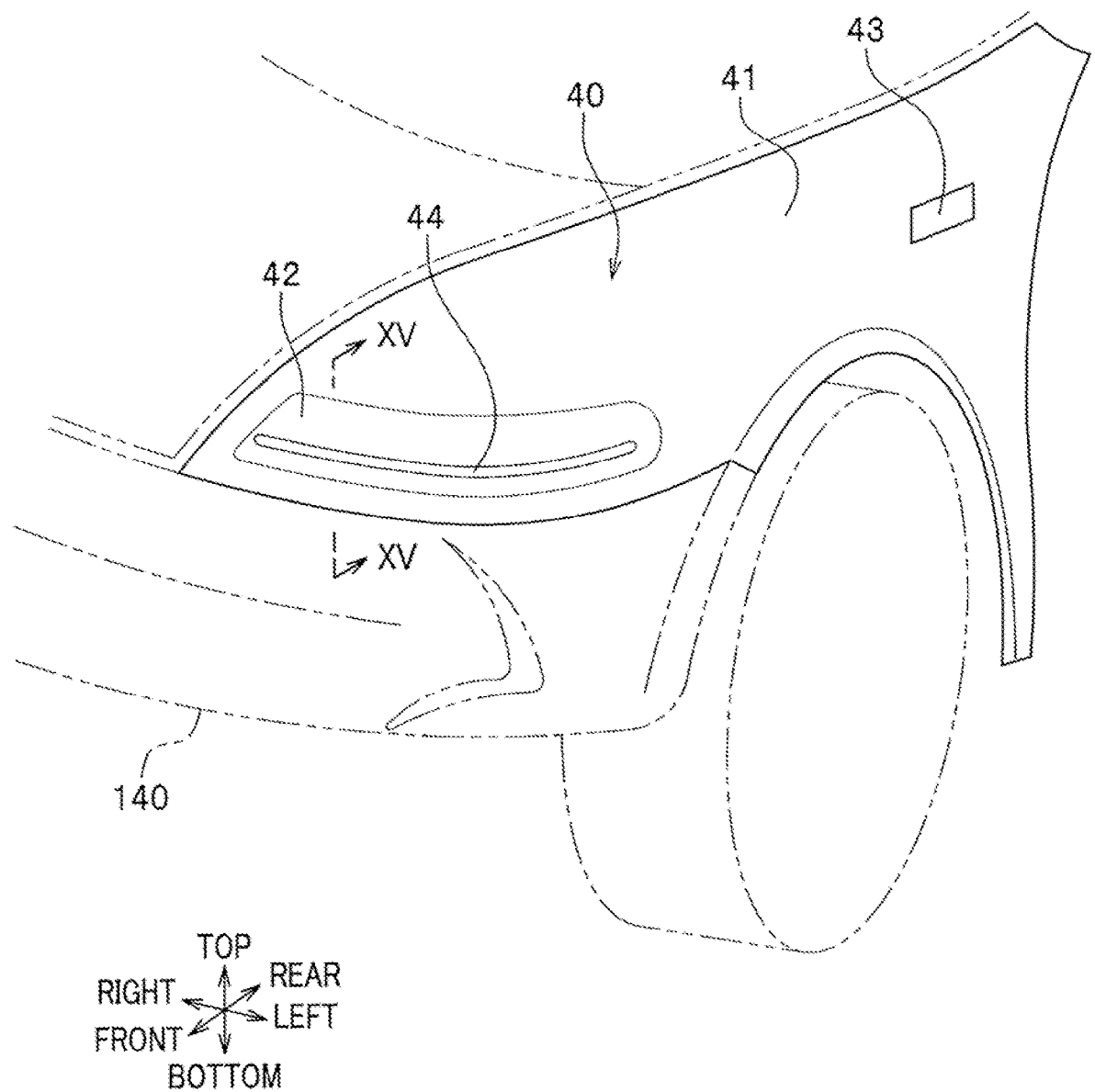
FIG. 14 is a perspective view of a front fender panel when viewed from the front upper left side.

As shown in FIG. 14, an outer plate panel 40 constitutes a front fender panel 41, namely, a vehicle front left-side wall extending rearward relative to a left portion of a bumper face 140.

In addition, the outer plate panel 40 includes a head light lens 42 that is positioned on the front side and extends in the vehicle widthwise direction and a turn light lens 43. Further, a lower side of the lens 42 has a molding 44 that extends in the vehicle widthwise direction and decorates the lens.

Although not particularly depicted, this outer plate panel 40 is a part produced by pressure-molding a flat transparent resin plate (transparent polycarbonate plate) having a decorative layer on the back surface into a prescribed shape and then by cutting an unwanted portion. Thus, one transparent resin is used to form the front fender panel 41, the lens 42, the lens 43, and the molding 44, which are integrated.

Figure 15:
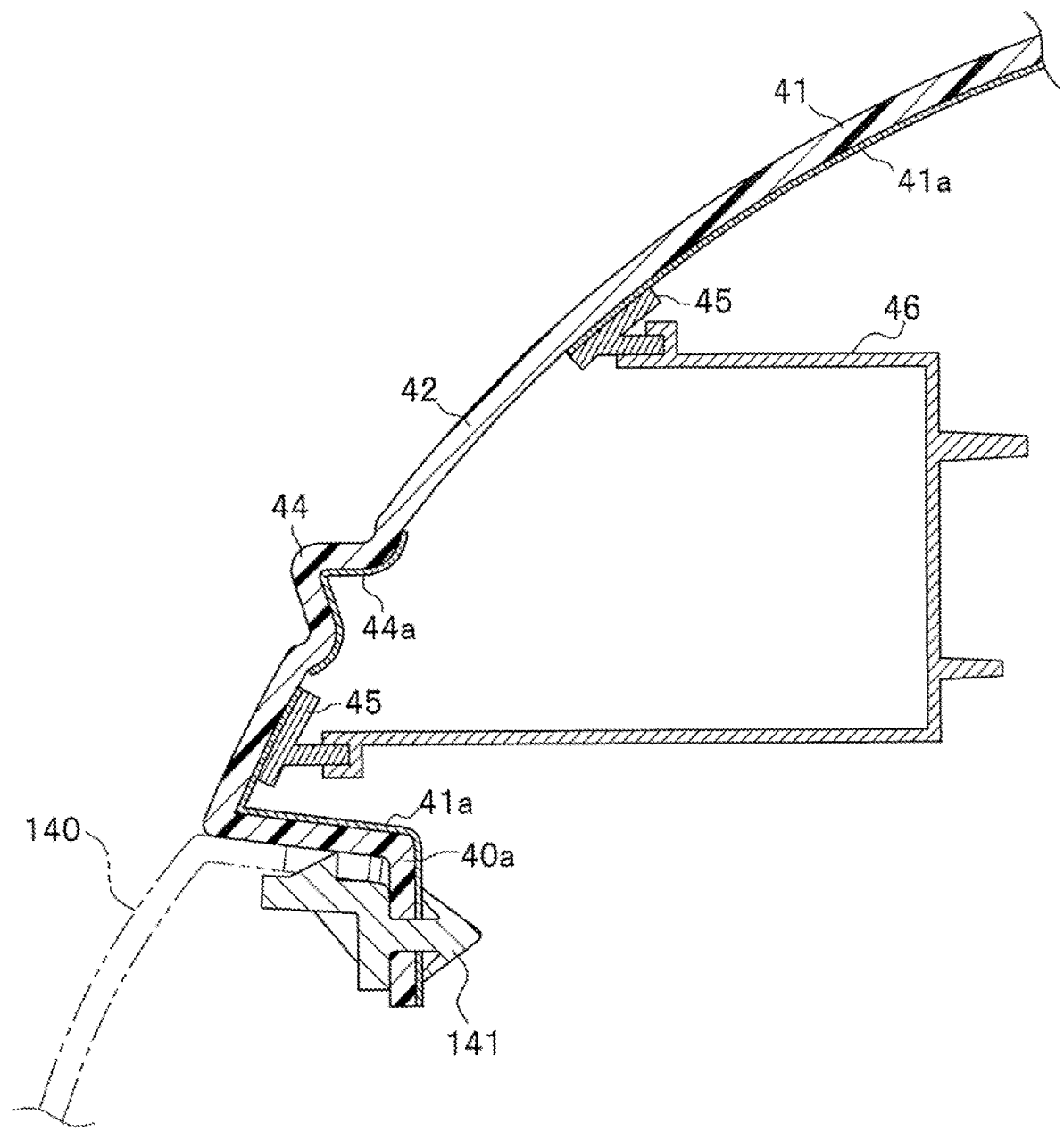
FIG. 15 is a sectional view cut along the arrowed line XV-XV in FIG. 14.

As shown in FIG. 15, a decorative layer 41a of the front fender panel 41 has a body color produced by screen printing and the whole vehicle has a unified color.

Note that a front edge portion of the outer plate panel 40 has a mounting portion 40a that extends to the back-surface side and further extends downward. A clip 141 is stuck into this mounting portion 40a. This causes the outer plate panel 40 and the bumper face 140 to be integrated.

A pedestal member 45 having a protrusion part on its seat surface is provided on the back-surface side of the front fender panel 41 and at or near the lens 42. Then, this pedestal member 45 is bonded to a housing 46 that supports a light-emitting section (not shown) of a head light. Note that in FIG. 15, the internal structure of the housing 46 is omitted.

The lens 42 is curved and positioned gradually upward toward the rear side relative to the front side.

The lens 42 has no decorative layer. Thus, light emitted by a light-emitting section (not shown) on the rear side of the lens 42 is emitted forward without any color change.

The molding 44 has a protrusion and is projected forward relative to the lens 42. The back surface of the molding 44 has a silver decorative layer 44a. Thus, light incident on the molding 44 is reflected.

In addition, although not particularly depicted, the back surface of the turn light lens 43 has a yellow decorative layer produced by screen printing.

Collectively, this embodiment can reduce the number of parts because it is unnecessary to separately produce the lenses 42 and 42 and the molding 44.

Next, modification embodiments of the third embodiment will be described.

As a first modification embodiment, described is a case where a decorative layer formed on a transparent part (lens) has a relatively high light transmittance.

Figure 16:
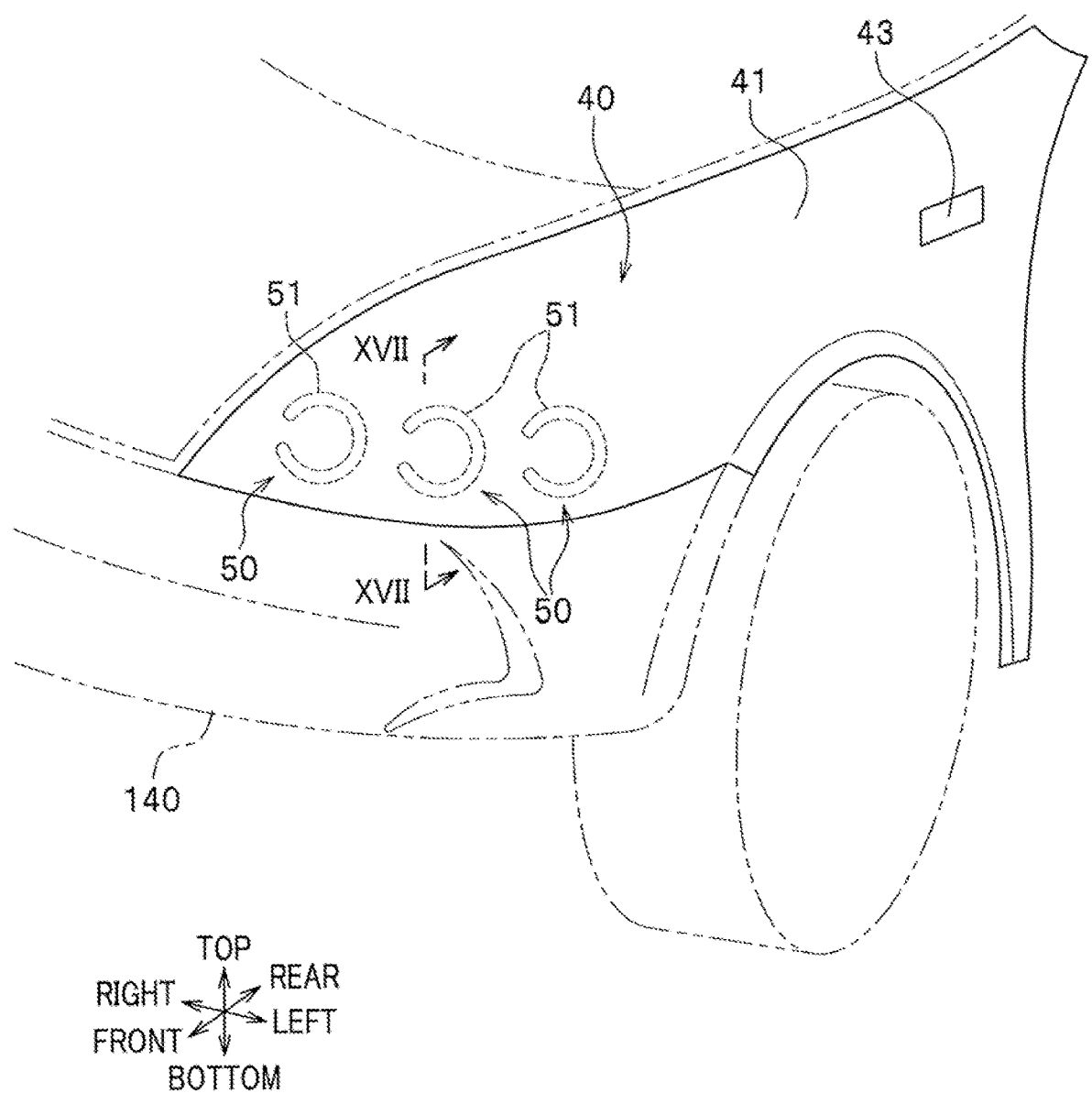
FIG. 16 is a perspective view illustrating a head light in a modification embodiment.

As shown in FIG. 16, three head lights 50 according to the modification embodiment are provided. The outer plate panel 40 corresponds to this configuration and has three lenses 51. Each lens 51 is formed like a C-shape in a front view. Note that a light-emitting section 52 of the head light 50 in the modification embodiment corresponds to the shape of the lens 51 and has an approximately C-shape.

Figure 17:
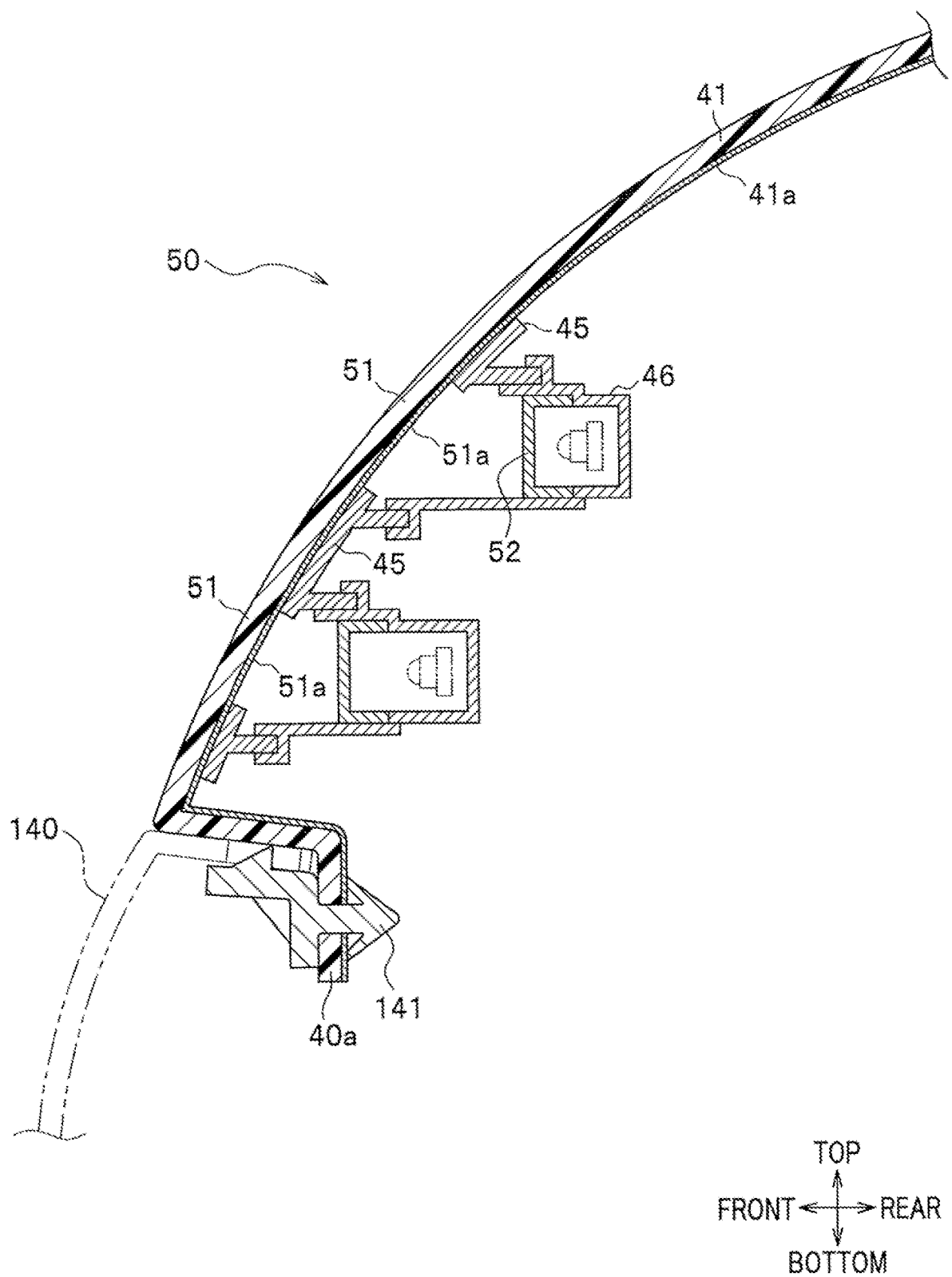
FIG. 17 is a sectional view cut along the arrowed line XVII-XVII in FIG. 16.

As shown in FIG. 17, the back surface of the lens 51 in the modification embodiment has a decorative layer 51a having the same body color. In addition, the thickness of the decorative layer 51a is thinner than that of the decorative layer 41a of the front fender panel 41. Accordingly, the decorative layer 51a has a higher light transmittance than the decorative layer 41a and thus has a half mirror design.

Figure 18:
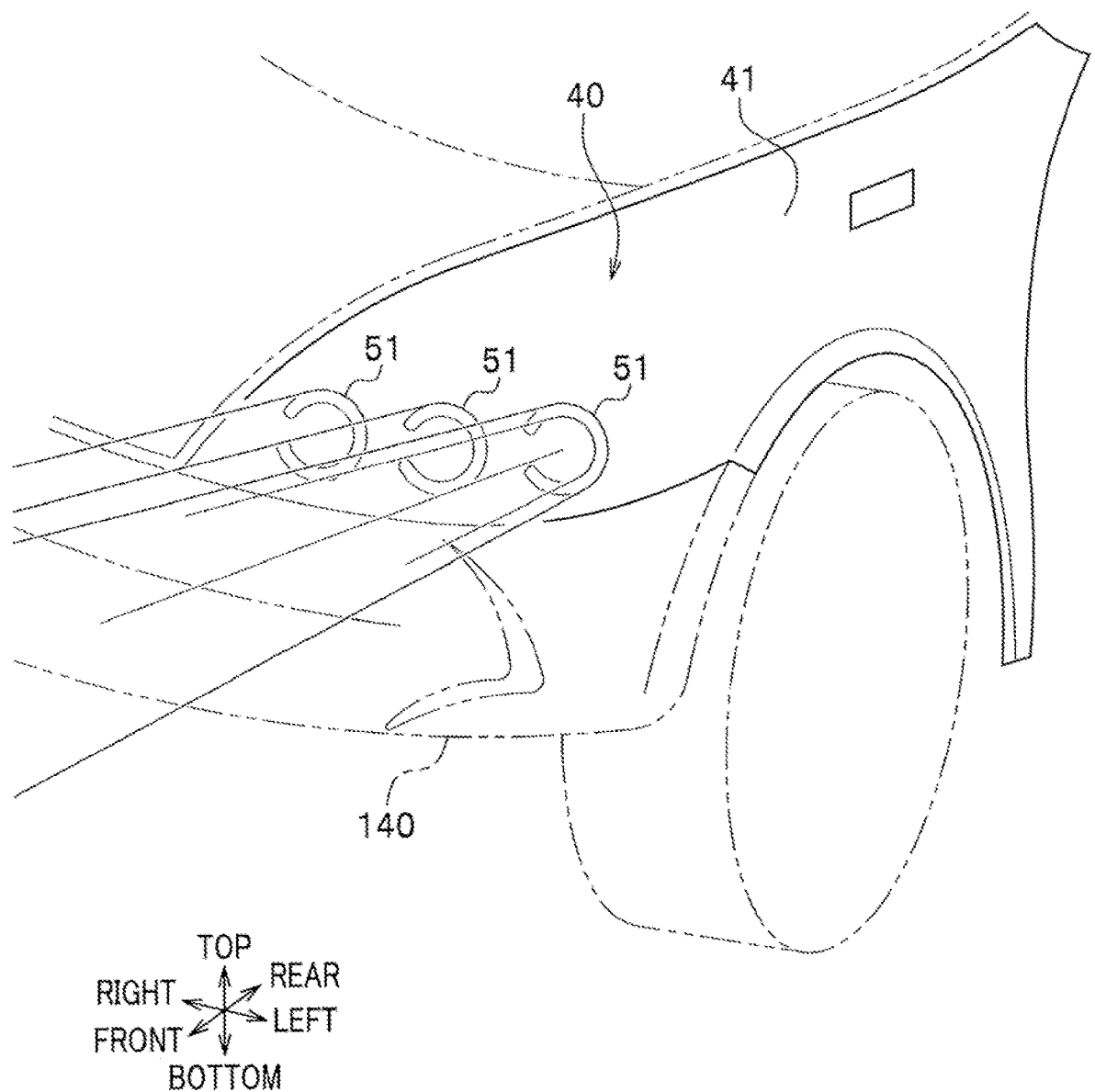
FIG. 18 is a perspective view of the head light in a lighting state in the modification embodiment.

Collectively, as shown in FIG. 16, when the outer plate panel 40 is viewed from the vehicle outside, it is difficult to visually recognize the shape of the lens 51 (the borderline between the front fender panel 41 and the lens 51) and the outer plate panel 40 has a unified body color. Meanwhile, when the light-emitting section 52 emits light, the light penetrates through the decorative layer 51a and the lens 51 and the resulting approximately C-shaped light is emitted forward as illustrated in FIG. 18.

The above describes the decorative layer 51a having a half mirror design. Such a decorative layer is applicable to those other than the lens.

Figure 19:
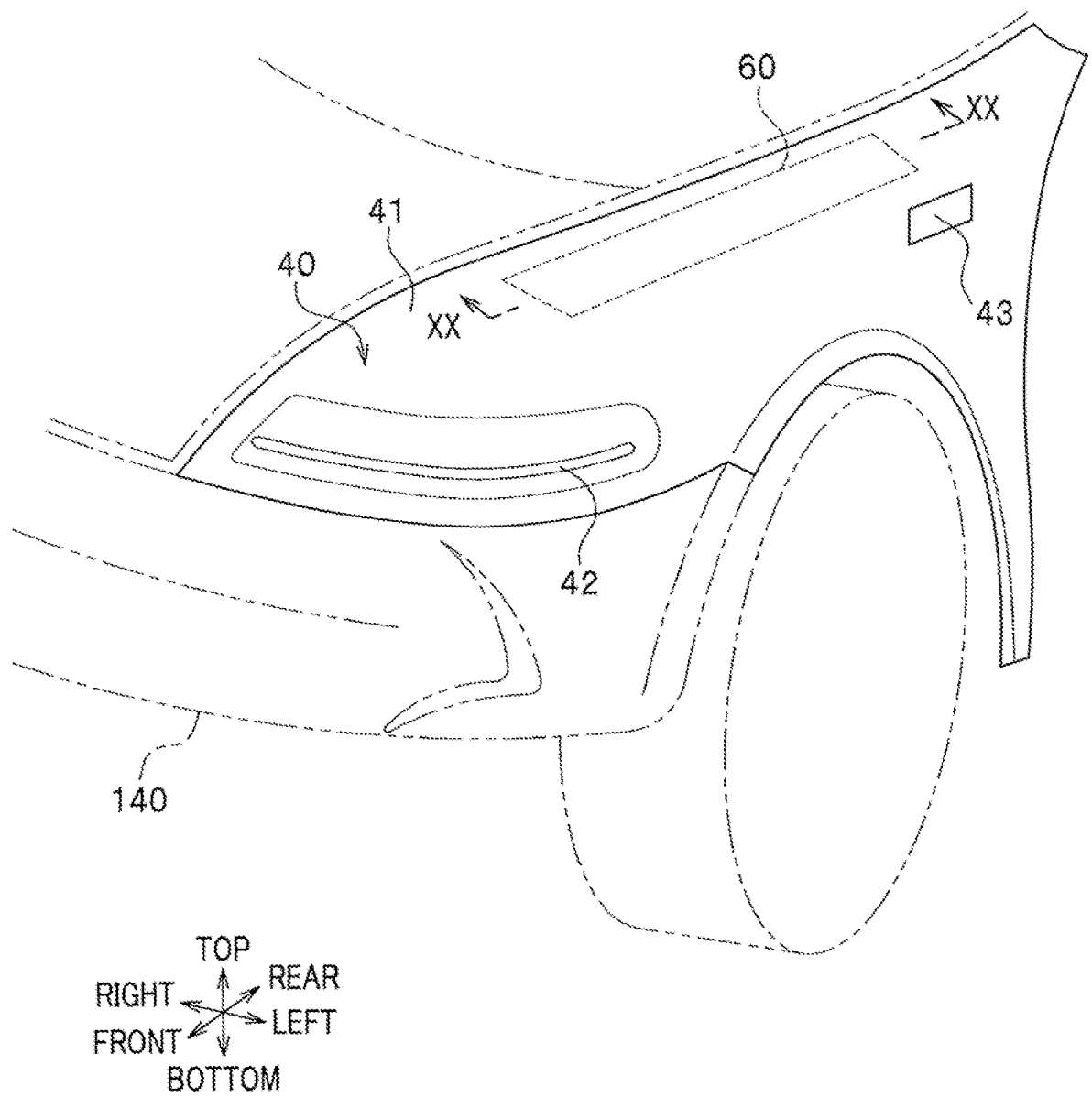
FIG. 19 is a perspective view of a front fender panel with a decorative layer in the modification embodiment when viewed from the front upper left side.

For instance, as shown in FIG. 19, a region (between the head light lens 42 and the turn light lens 43) of the outer plate panel 40 may have a decorative layer 60 with a half mirror design.

Specifically, the decorative layer 60 is rectangular and extends in the vehicle longitudinal direction. In addition, the decorative layer 60 has the same color as the decorative layer 41a of the front fender panel 41. The decorative layer 60 is thinner than the decorative layer 41a. Accordingly, the decorative layer 60 has a higher light transmittance than the decorative layer 41a and thus has a half mirror design.

Figure 20:
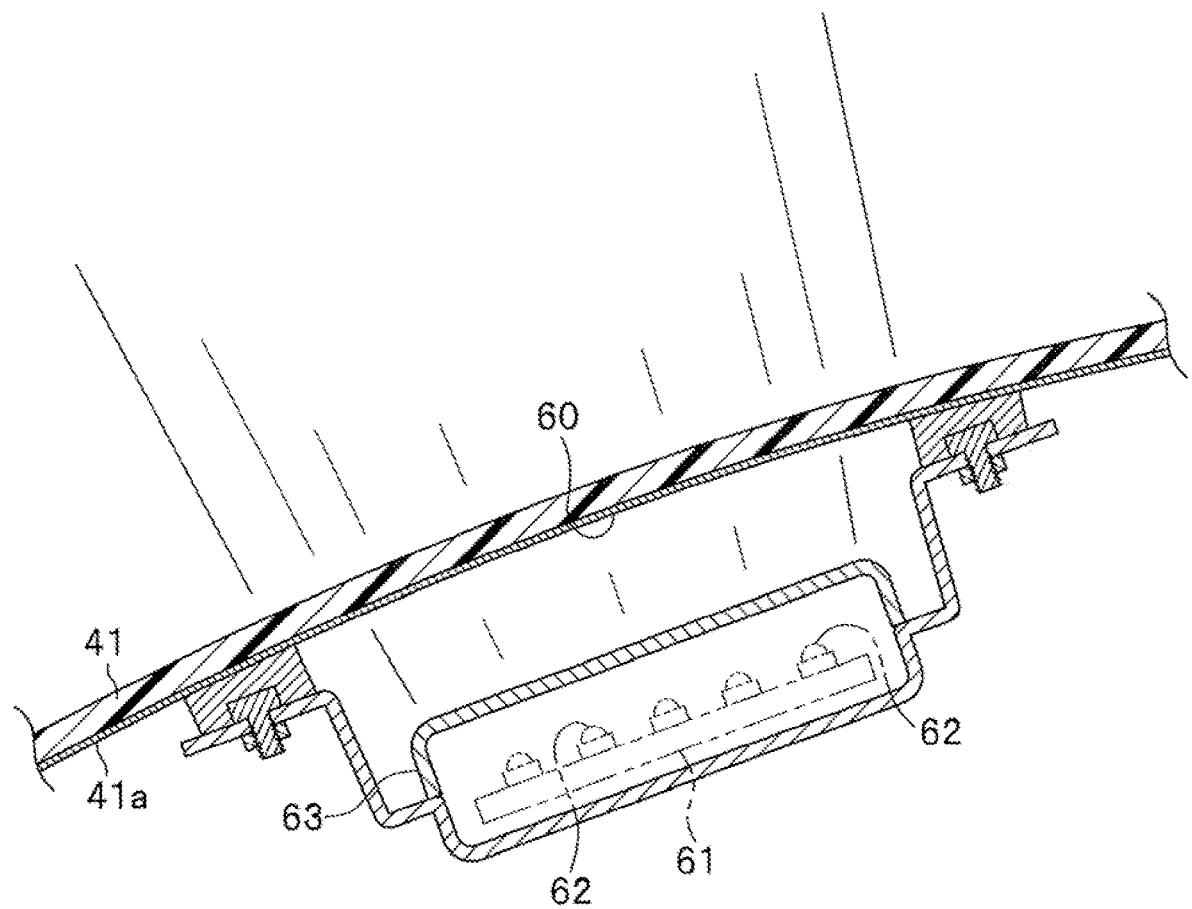
FIG. 20 is a sectional view cut along the arrowed line XX-XX in FIG. 19.

In addition, as shown in FIG. 20, a light-emitting section 61 is provided below the decorative layer 60. This light-emitting section 61 includes five LEDs 62 aligned in the vehicle longitudinal direction and a diffusion sheet 63 that diffuses light from the LEDs 62 in the vehicle longitudinal direction.

This enables light to be emitted through the decorative layer 60 between the head light and the turn light in the outer plate panel 40. In other words, this makes it possible to express or transmit a behavioral intention of, for instance, an automatic driving vehicle to the surrounding.

Fourth Embodiment

Next, an application to a rear fender panel on the left side will be described.

Figure 21:
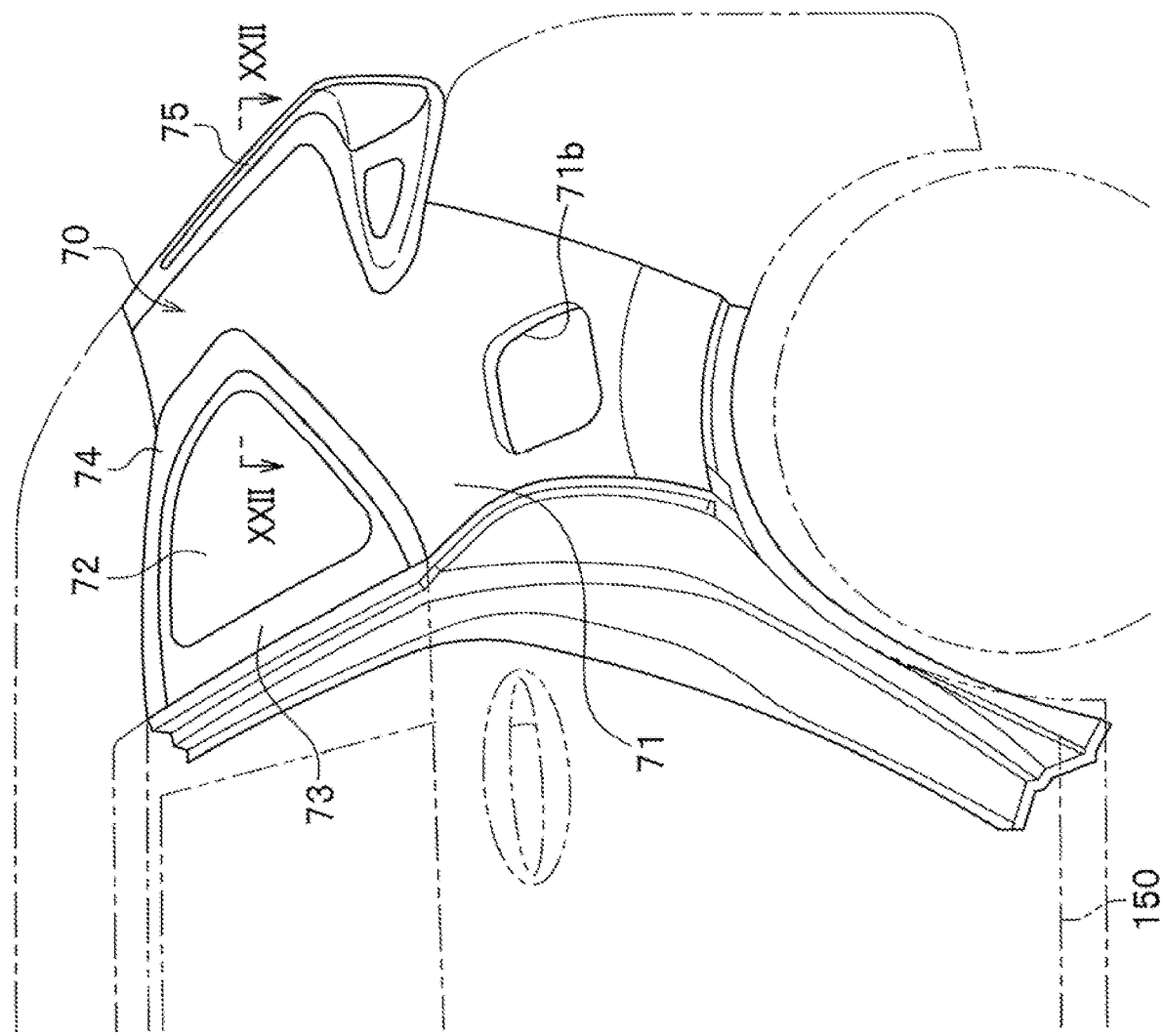
FIG. 21 is a side view of a rear fender panel when viewed from the left side.

As shown in FIG. 21, an outer plate panel 70 constitutes a rear fender panel 71, namely, a vehicle rear left wall section (outer plate panel) that is arranged on the rear side of a rear door 150.

In addition, the outer plate panel 70 includes an approximately triangular window part 72, a window frame part 73 surrounding the window part 72, a molding 74 provided at the outer boundary of the window frame part 73, and a tale lamp lens 75.

Although not particularly depicted, this outer plate panel 70 is a part produced by pressure-molding a flat transparent resin plate (transparent polycarbonate plate) having a decorative layer on the back surface into a prescribed shape and then by cutting an unwanted portion. Thus, one transparent resin plate is used to form the rear fender panel 71, the window part 72, the window frame part 73, the molding 74, and the tale lamp lens 75, which are integrated. Additionally, the outer plate panel 70 has a rectangular oil feed hole 71b formed through the cutting step.

Figure 22:
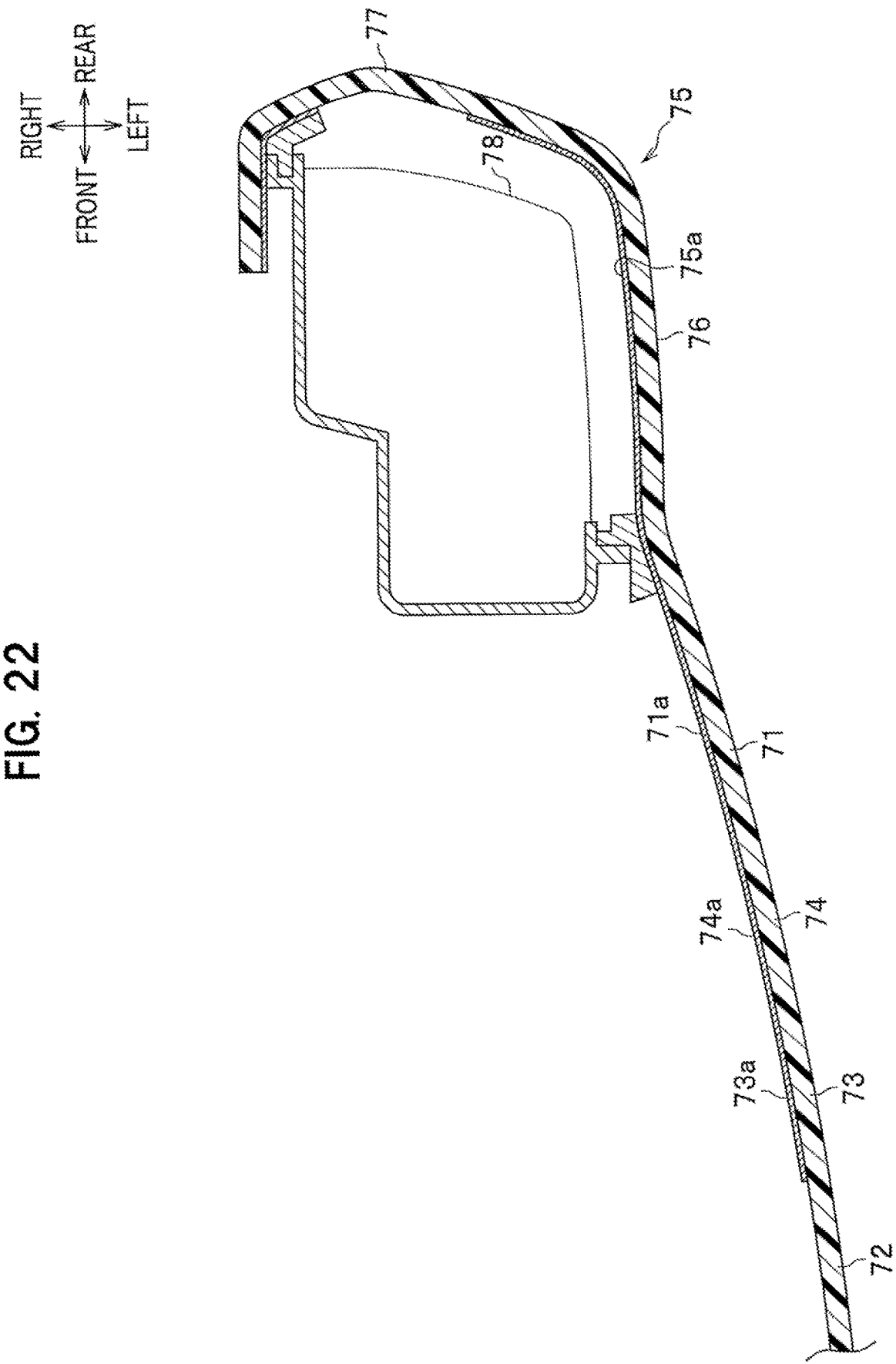
FIG. 22 is a sectional view cut along the arrowed line XXII-XXII in FIG. 21.

As shown in FIG. 22, a decorative layer 71a of the rear fender panel 71 has a body color produced by screen printing and the whole vehicle has a unified color. The window part 72 has no decorative layer. The back surface of the window frame part 73 has a black decorative layer 73a formed by screen printing. The back surface of the molding 74 has a silver decorative layer 74a formed by screen printing. Thus, the molding 74 decorates the outer boundary of the window frame part 73 by using a silver color.

As shown in FIG. 22, the lens 75 has a left surface 76 facing the vehicle left direction and a rear surface 77 facing the rear direction.

At the lens 75, the whole back surface of the left surface 76 and a site from a middle portion of the rear surface 77 in the vehicle width direction to an outer side have a semi-transparent red decorative layer 75a. By contrast, a site from the middle portion of the rear surface in the widthwise direction to an inner side has no decorative layer. Accordingly, when light is emitted from a light-emitting section 78 of the tale lamp, light penetrating through the inner side of the rear surface 77 is emitted rearward as white or yellow light. By contrast, light penetrating through the left surface 76 and the outer side of the rear surface 77 is emitted as red color light.

Fifth Embodiment

Next, an application to a roof will be described.

Figure 23:
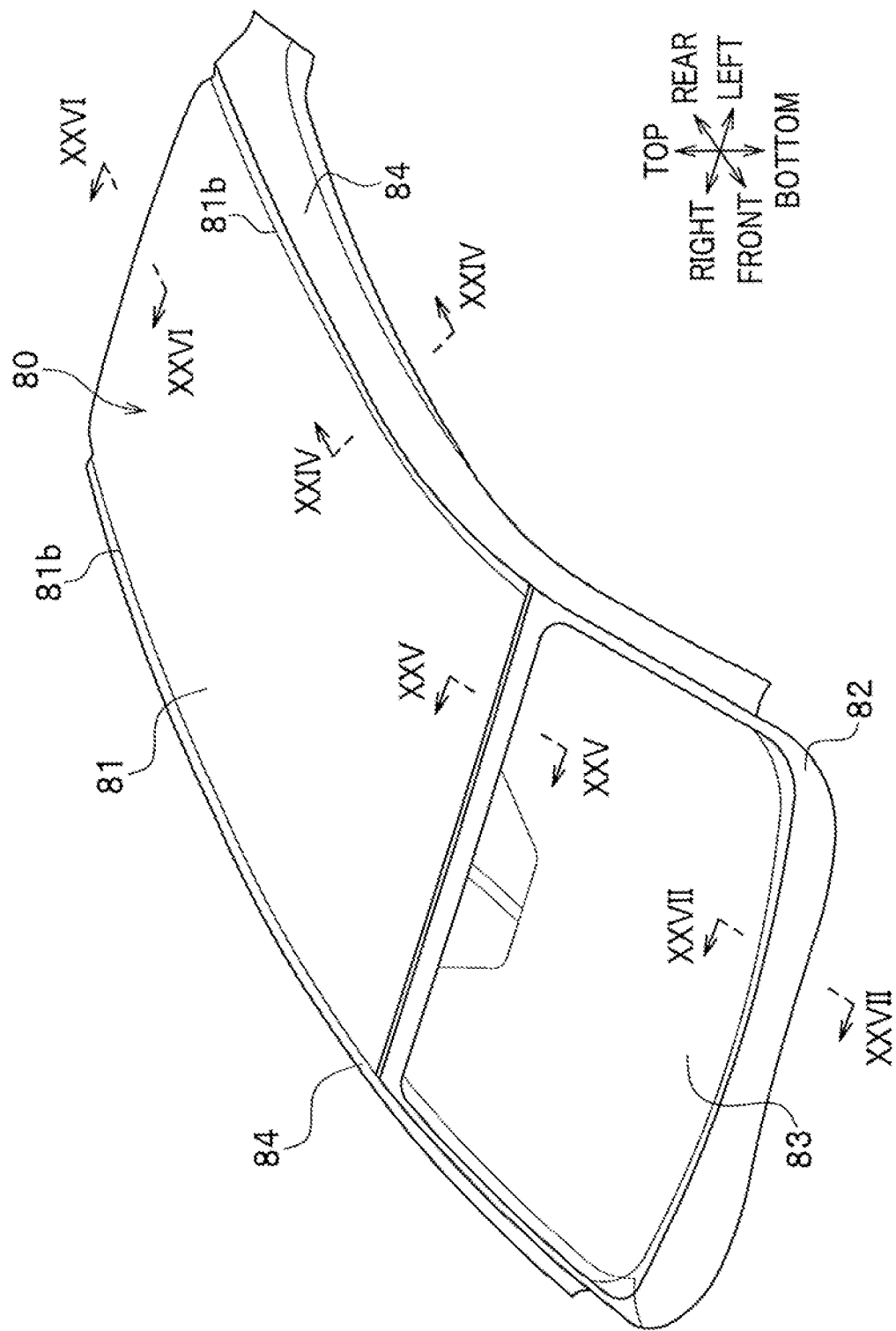
FIG. 23 is a perspective view of a roof when viewed from the front upper left side.

As shown in FIG. 23, an outer plate panel 80 constitutes a roof 81, namely, an outer wall constituting a cabin roof outer wall that is arranged over a cabin and is horizontally flat.

In addition, the outer plate panel 80 includes: a rectangular frame-shaped window frame part 82 that is provided on the front end of the roof 81; a front window part 83 provided inside the window frame part; and left- and right-side outer panels 84 and 84 that extend along both left and right ends of the roof and the window frame part in the vehicle longitudinal direction.

Although not particularly depicted, this outer plate panel 80 is a part produced by pressure-molding a flat transparent resin plate (transparent polycarbonate plate) having a decorative layer on the back surface into a prescribed shape and then by cutting an unwanted portion. Thus, one transparent resin plate is used to form the roof 81, the window frame part 82, the front window part 83, and the left- and right-side outer panels 84 and 84, which are integrated.

Figure 24:
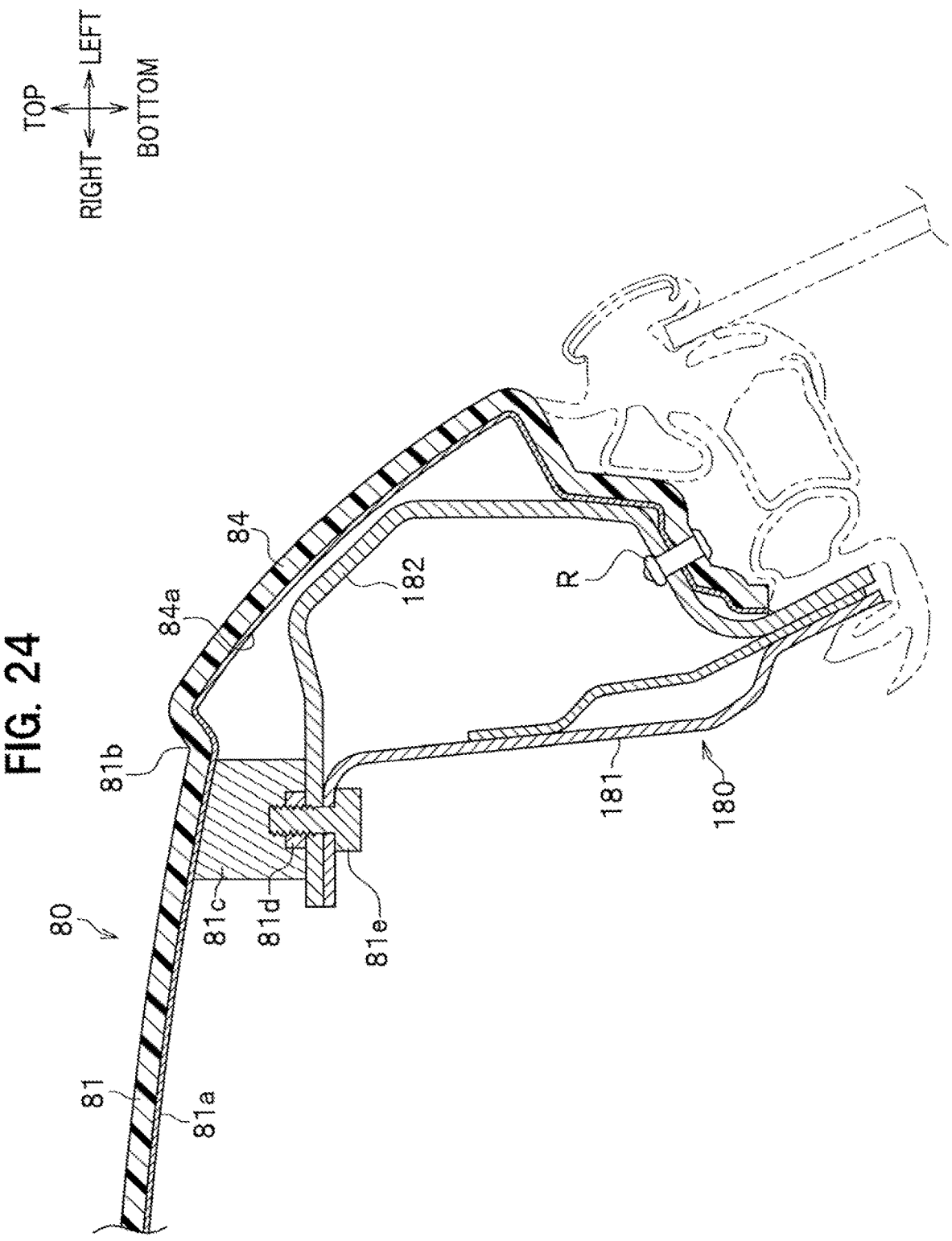
FIG. 24 is a sectional view cut along the arrowed line XXIV-XXIV in FIG. 23.

As shown in FIG. 24, a decorative layer 81a formed on the back surface of the roof 81 and decorative layers 84a and 84a formed on the back surfaces of the side outer panels 84 and 84 have a body color produced by screen printing and the whole vehicle has a unified color.

Both left and right ends of the roof 81 each have a recessed portion 81b that is indented downward. This recessed portion 81b extends in the vehicle longitudinal direction (see FIG. 23) and plays a role of a conventional roof molding. Thus, use of this recessed portion 81b makes it unnecessary to use the conventional roof molding, and improves a design of the roof 81.

Next, the roof 81-fixing structure will be described.

As shown in FIG. 24, the back-surface side of each left or right end of the roof 81 has a pedestal member 81c having a nut 81d bonded. A bolt 81e, which penetrates through a side roof rail 180 from the bottom, is secured into this nut 81d. This immobilizes each left or light end of the roof 81 to the side roof rail 180.

Note that the side roof rail 180 is composed of a set of frame members 181 and 182 that are bonded to form a closed cross section shape. In addition, a lower end of the side outer panel 84 is fixed to the frame member 182 by using a rivet R.

Figure 25:
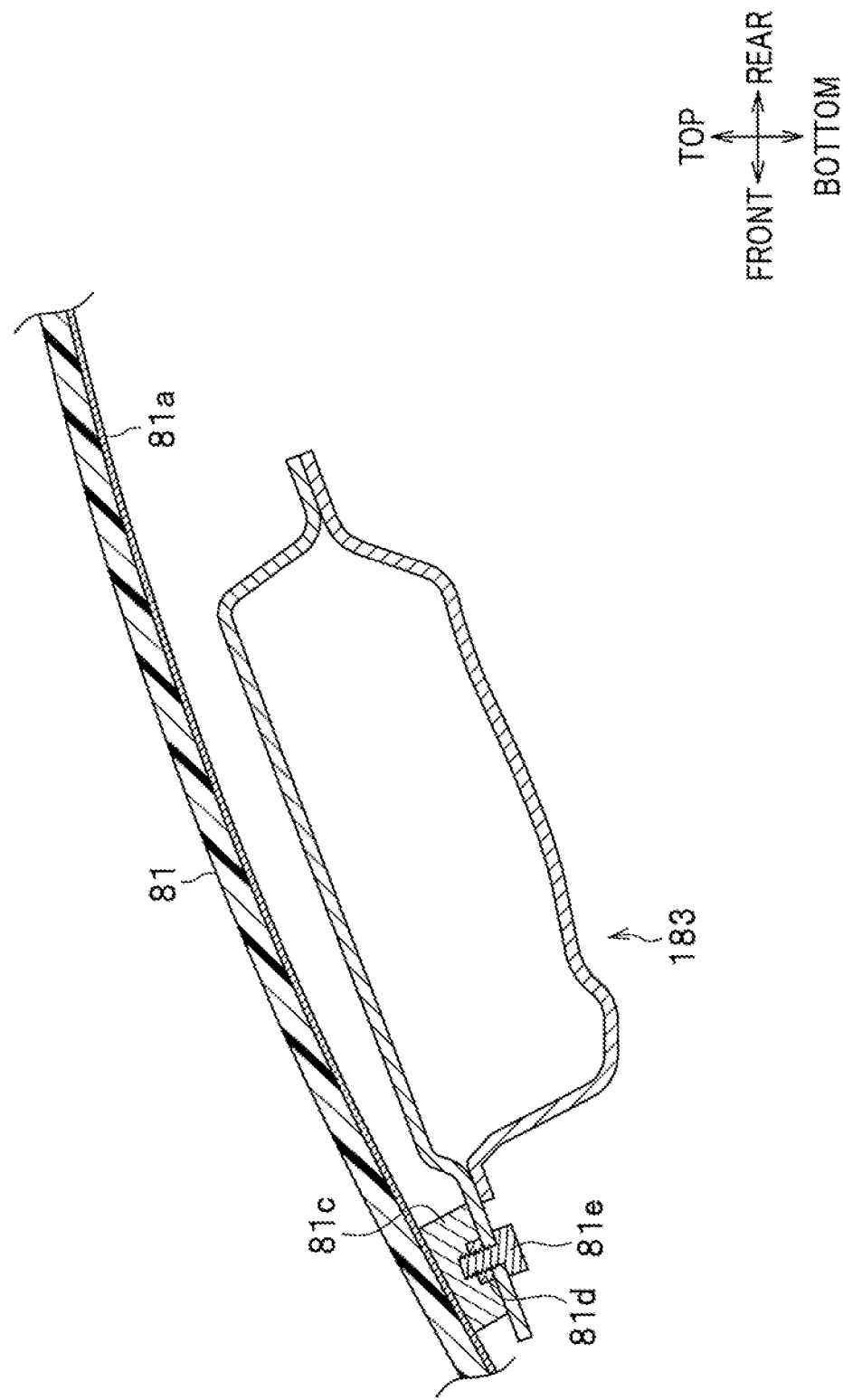
FIG. 25 is a sectional view cut along the arrowed line XXV-XXV in FIG. 23.

Further, as shown in FIG. 25, the back-surface side of a front end of the roof 81 has a pedestal member 81c having a nut 81d bonded. A bolt 81e, which penetrates through a front roof rail 183 from the bottom, is secured into this nut 81d. This immobilizes the front end of the roof 81 to the front roof rail 183.

Figure 26:
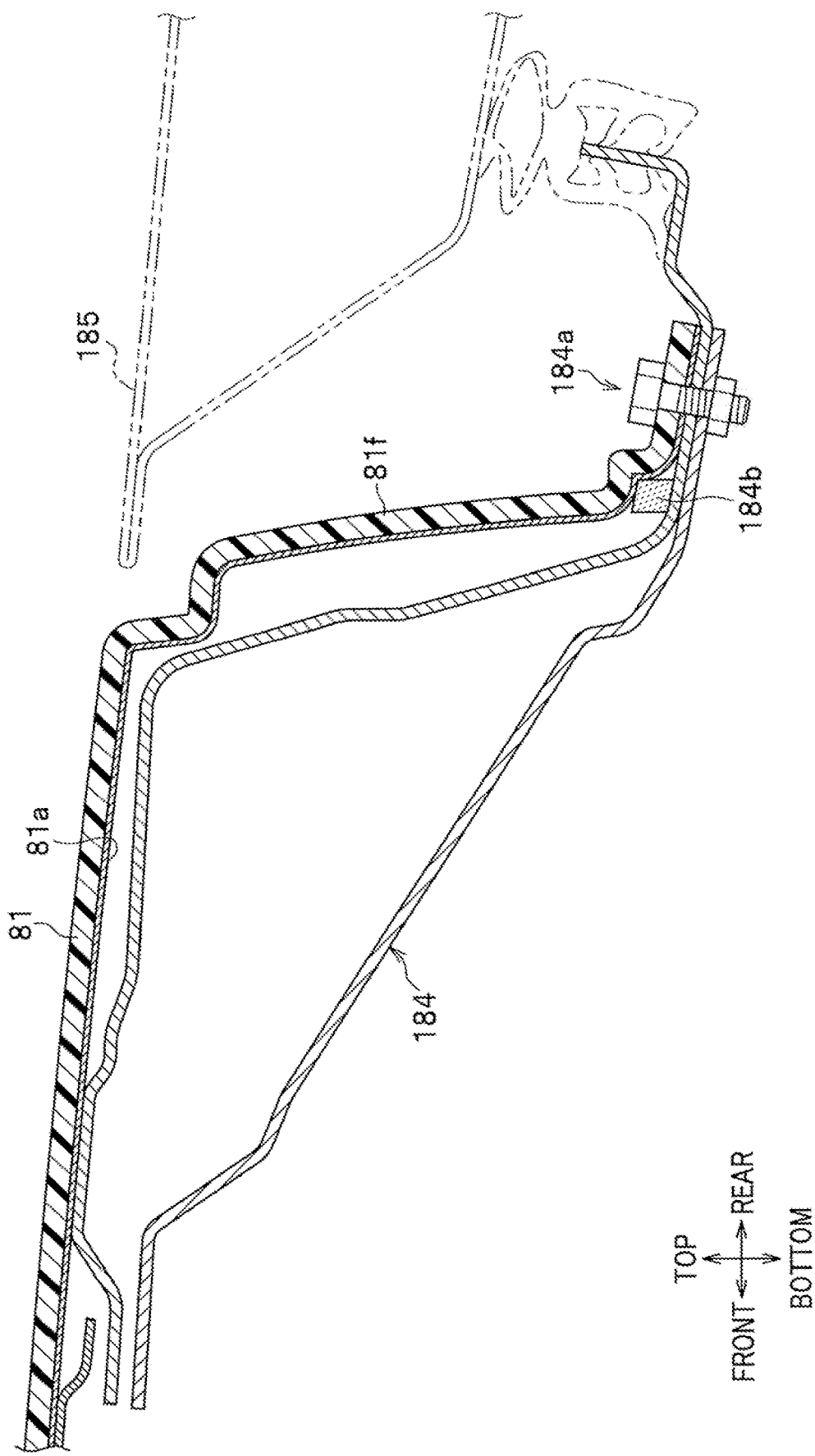
FIG. 26 is a sectional view cut along the arrowed line XXVI-XXVI in FIG. 23.

Furthermore, as shown in FIG. 26, a rear section of the roof 81 has a mounting portion 81f that extends downward relative to a rear edge and is secured to a rear roof rail 184 by using a fastener 184a.

Moreover, a sealing material 184b made of foamed urethane is interposed between the mounting portion 81f and the rear roof rail 184 so as to prevent liquid from entering a cabin side.

Note that the mounting portion 81f and the fastener 184a are covered by the tail gate 185 and are invisible.

Next, the window frame part 82 and the front window part 83 will be described.

Figure 27:
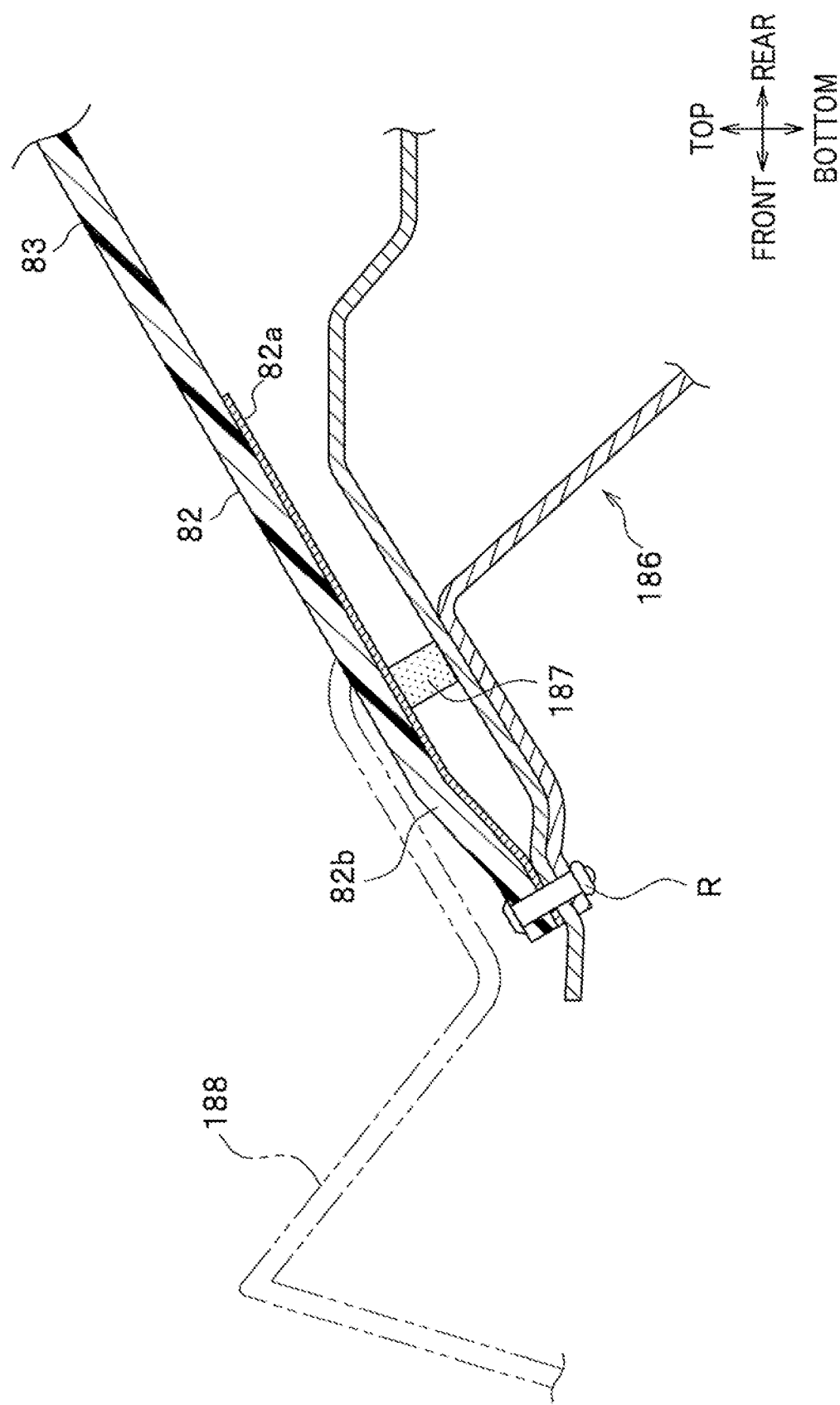
FIG. 27 is a sectional view cut along the arrowed line XXVII-XXVII in FIG. 23.

As shown in FIG. 27, the back surface of the window frame part 82 has a black decorative layer 82a and the color of the window frame part 82 is black. By contrast, the back surface of the front window part 83 has no decorative layer.

A bottom section 82b of the window frame part 82 is fixed using a rivet R to a windshield 186.

A sealing material 187 made of foamed urethane is interposed between the bottom section 82b of the window frame part 82 and the frame member so as to prevent liquid from entering a cabin side.

In addition, the bottom section 82b of the window frame part 82, which section has the rivet R and the sealing material 187 arranged, is covered by a front cowl top 188 and is invisible.

Sixth Embodiment

Next, described is a case where a LIDAR (Light Detection and Ranging) 92 is assembled on an outer plate panel 90.

Figure 28:
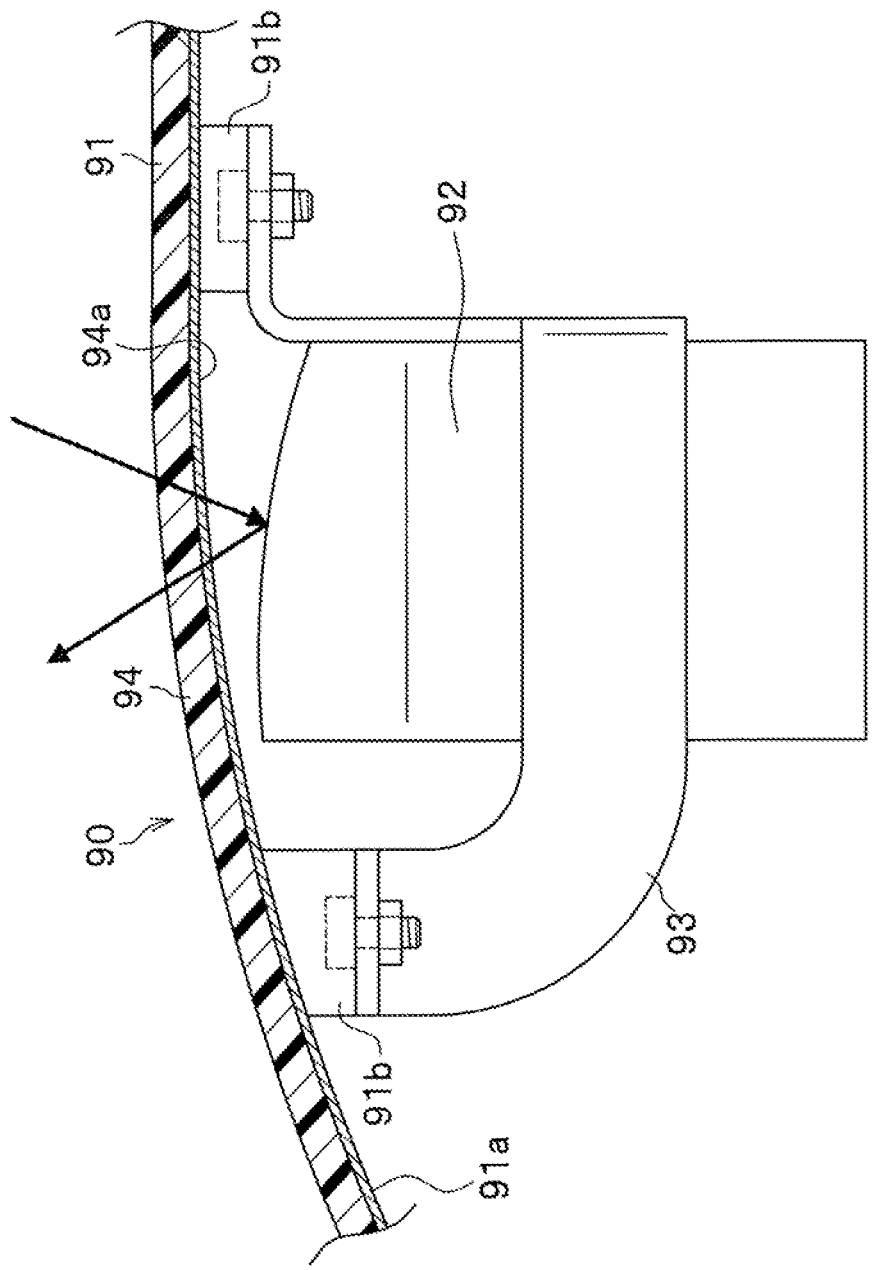
FIG. 28 is a cross-sectional view of a LIDAR-mounted outer plate panel when viewed as a cross section.

As show in FIG. 28, the LIDAR 92 is a device used for automatic running and is a device configured to emit a pulsed laser beam and then detect scattered light (see the arrows in FIG. 28) and to calculate a distance by using the reflection time (time from the light emission to the reflected light detection).

The back surface of a transparent resin 91 constituting the outer plate panel 90 has a body-color decorative layer 91a produced by screen printing. In addition, the back surface of the transparent resin 91 has pedestal members 91b for fixing a bracket 93 that supports the LIDAR 92.

Further, the outer plate panel 90 has a transparent part 94. The back surface of the transparent part 94 has a decorative layer 94a produced using an infrared-transparent ink by screen printing. Thus, the LIDAR 92 can emit a laser beam to the vehicle outside and receive (detect) light scattered into the vehicle inside through the transparent part 94.

Note that examples of the infrared-transparent ink include "IR ink" from Teikoku Printing Inks Mfg. Co., Ltd.

Further, the same color as of the decorative layer 91a of the outer plate panel 90 is used for the decorative layer 94a. Hence, the overall color of the outer plate panel 90 is unified and there is no risk of damaging the design.

REFERENCE SIGNS LIST 1, 1A, 91 Transparent resin plate
1a Back surface
2 Decorative layer
3, 3A Pedestal member
3a Seat surface
4 On-vehicle part
5 Stiffener
6 Protective layer
7 Double coated tape
8 Boss
13A Boundary
14 Recessed portion
14a Ridgeline
20a Folded portion
20b Mounting portion
21 Window part (Transparent part)
21a Electric heating wire (Electric wire)
24, 26 Lens (Transparent part)
30 Prism sheet (Refractive sheet)
41 Front fender panel
42 Lens (Transparent part)
71 Rear fender panel
72 Window part (Transparent part)
75 Lens (Transparent part)
81 Roof
83 Front window part (Transparent part)
84 Side outer panel
92 LIDAR
94 Transparent part
20, 40, 70, 80, 90, 100 Outer plate panel
R Rivet

The invention claimed is:

1. A vehicle outer plate panel comprising:
a transparent resin plate that is formed into a prescribed shape through pressure molding and is attached to a vehicle so as to constitute an outer wall of a body;
a decorative layer that is formed on at least a part of the transparent resin plate by screen printing such that the transparent resin plate is decorated therewith;
a pedestal member that is provided on a back-surface side of the transparent resin plate; and
an on-vehicle part that is fixed via the pedestal member to the back-surface side of the transparent resin plate,
wherein the pedestal member is curved along the transparent resin plate while a back surface of the pedestal member has a flat seat surface.

2. The vehicle outer plate panel according to claim 1, wherein the pedestal member is annular.

3. The vehicle outer plate panel according to claim 1 wherein the transparent resin plate comprises:
a folded portion that is folded inward on a back surface side from an edge portion; and
a mounting portion that extends from the folded portion and is mounted on a vehicle, and
is provided with a fastener member that secures the mounting portion and an edge portion of a frame member, wherein the fastener member is detachably secured.

4. The vehicle outer plate panel according to claim 1, wherein the decorative layer is provided on a back surface of the transparent resin plate.

5. The vehicle outer plate panel according to claim 1, wherein the transparent resin plate or the decorative layer has an electric wire produced by the screen printing.

6. A vehicle outer plate panel comprising:
a transparent resin plate that is formed into a prescribed shape by pressure molding and is attached to a vehicle so as to constitute an outer wall of a body; and
decorative layers that are formed on at least a part of the transparent resin plate by screen printing such that the transparent resin plate is decorated therewith,
wherein the transparent resin plate has a recessed portion that extends correspondingly to a boundary line between the decorative layers.

7. A vehicle outer plate panel comprising:
a transparent resin plate that is formed into a prescribed shape by pressure molding and is attached to a vehicle so as to constitute an outer wall of a body; and
a decorative layer that is formed on at least a part of the transparent resin plate by screen printing such that the transparent resin plate is decorated therewith,
wherein the transparent resin plate has a light-transmissive transparent part, and
the transparent part has a refractive sheet for causing penetrating light to be refracted, and
a part of the decorative layer formed on the transparent part has a half mirror design and a relatively high light transmittance.

8. The vehicle outer plate panel according to claim 7, wherein the transparent resin plate constituting the transparent part has roughness for light refraction.

9. A method of producing a vehicle outer plate panel that is attached to a vehicle and constitutes an outer wall of a body, the method comprising:
a decorative layer-forming step of forming a decorative layer on a transparent, flat, transparent resin plate by screen printing;
a pressure molding step of molding the transparent resin plate having the decorative layer into a prescribed shape by pressure molding;
before the pressure molding step, a pedestal member-fixing step of fixing a pedestal member on a back-surface side of the transparent resin plate; and
after the pressure molding step, a cutting step of cutting the transparent resin plate and the pedestal member.

10. The method of producing the vehicle outer plate panel according to claim 9, further comprising:
after the pedestal member-fixing step and before the pressure molding step, a stacking step of stacking, in sequence, the transparent resin plates,
wherein during the pedestal member-fixing step, at least three pedestal members with the same thickness are fixed and during the stacking step, the three pedestal members are arranged at relative positions that can support the transparent resin plate stacked on an upper side.

* * * * *